(12) United States Patent
Surampudi et al.

(10) Patent No.: US 6,265,093 B1
(45) Date of Patent: Jul. 24, 2001

(54) DIRECT METHANOL FEED FUEL CELL AND SYSTEM

(75) Inventors: Subbarao Surampudi, Glendora; Harvey A. Frank, Encino; Sekharipuram R. Narayanan, Altadena; William Chun, Los Angeles; Barbara Jeffries-Nakamura; Andrew Kindler, both of San Marino; Gerald Halpert, Pasadena, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/437,997

(22) Filed: Nov. 10, 1999

Related U.S. Application Data

(62) Division of application No. 09/006,846, filed on Jan. 14, 1998, now Pat. No. 6,146,781, which is a continuation of application No. 08/569,452, filed on Dec. 8, 1995, now Pat. No. 5,773,162, which is a continuation of application No. 08/135,007, filed on Oct. 12, 1993, now Pat. No. 5,599,638, which is a continuation-in-part of application No. 08/478,801, filed on Jun. 7, 1995.

(51) Int. Cl.$^7$ ...................................... H01M 8/04
(52) U.S. Cl. .................. 429/13; 429/19; 429/34
(58) Field of Search .................... 210/435, 500.1, 210/510.1; 429/19, 34, 13

(56) References Cited

U.S. PATENT DOCUMENTS

| | | | |
|---|---|---|---|
| 4,125,676 | * | 11/1978 | Maricle et al. ...................... 429/38 |
| 4,130,484 | * | 12/1978 | Marwil et al. . | |
| 4,350,608 | * | 9/1982 | Gestaut ................................ 502/101 |
| 4,395,322 | * | 7/1983 | Harris .............................. 502/101 X |
| 4,526,843 | * | 7/1985 | Kaufman et al. ................... 429/38 X |
| 4,728,533 | * | 3/1988 | Feigenbaum et al. ............. 429/35 X |
| 4,766,043 | * | 8/1988 | Shirogami et al. ..................... 429/39 |
| 4,824,739 | * | 4/1989 | Beault et al. ...................... 429/35 X |
| 5,013,618 | * | 5/1991 | Luczak ................................... 429/44 |
| 5,019,263 | * | 5/1991 | Haag et al. ................... 210/500.1 X |
| 5,225,391 | * | 7/1993 | Stone Hart et al. ............... 429/44 X |
| 5,250,184 | * | 10/1993 | Maier ............................ 210/510.1 X |
| 5,294,232 | * | 3/1994 | Sakairi et al. .................... 502/101 X |
| 5,294,580 | * | 3/1994 | Dufner ............................... 429/44 X |
| 5,415,888 | * | 5/1995 | Banerjee et al. .................. 429/42 X |
| 5,561,000 | * | 10/1996 | Dirven et al. ......................... 429/42 |
| 5,603,830 | * | 2/1997 | Everhart et al. .............. 210/500.1 X |
| 5,679,248 | * | 10/1997 | Blaney .......................... 210/510.1 X |
| 5,928,807 | * | 7/1999 | Elias .................................. 429/38 X |
| 5,935,431 | * | 8/1999 | Korin .............................. 210/435 X |

FOREIGN PATENT DOCUMENTS

426546 * 5/1991 (EP) .

OTHER PUBLICATIONS

WPAT Abstract for Japanese 2–051865 Feb. 21, 1990 Matsushita Electric.*
WPAT Abstract for Japanese Patent 2–051865, Feb. 21,1990, Matsushita Electric.*

* cited by examiner

*Primary Examiner*—Stephen Kalafut
(74) *Attorney, Agent, or Firm*—Fish & Richardson P.C.

(57) ABSTRACT

Improvements to non acid methanol fuel cells include new formulations for materials. The backing material for the fuel cell electrode is specially treated to improve its characteristics. A special sputtered electrode is formed which is extremely porous. Methanol is delivered to the fuel cell through a filter comprising molecular sieves.

14 Claims, 12 Drawing Sheets

AF GAS

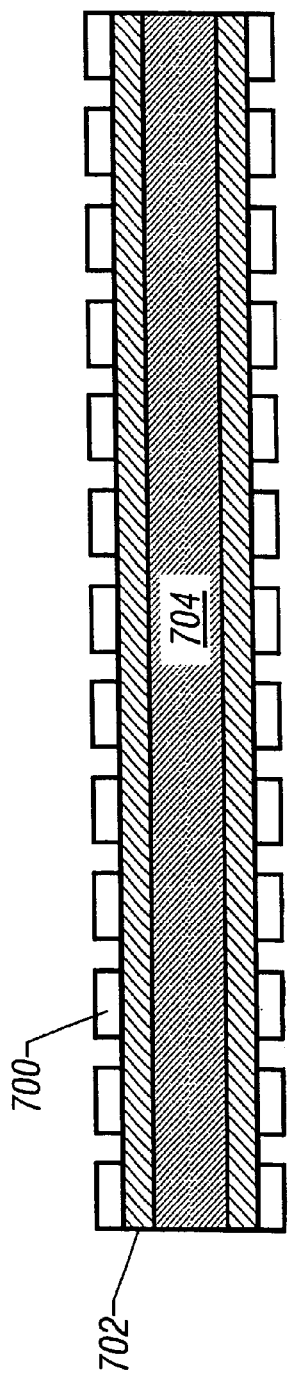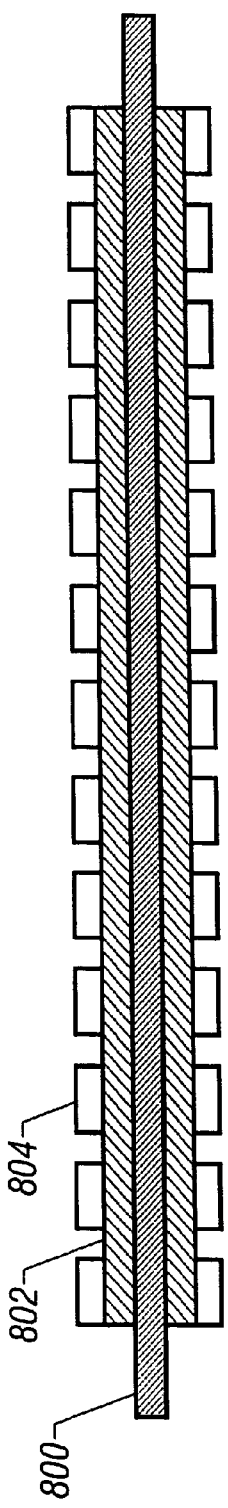

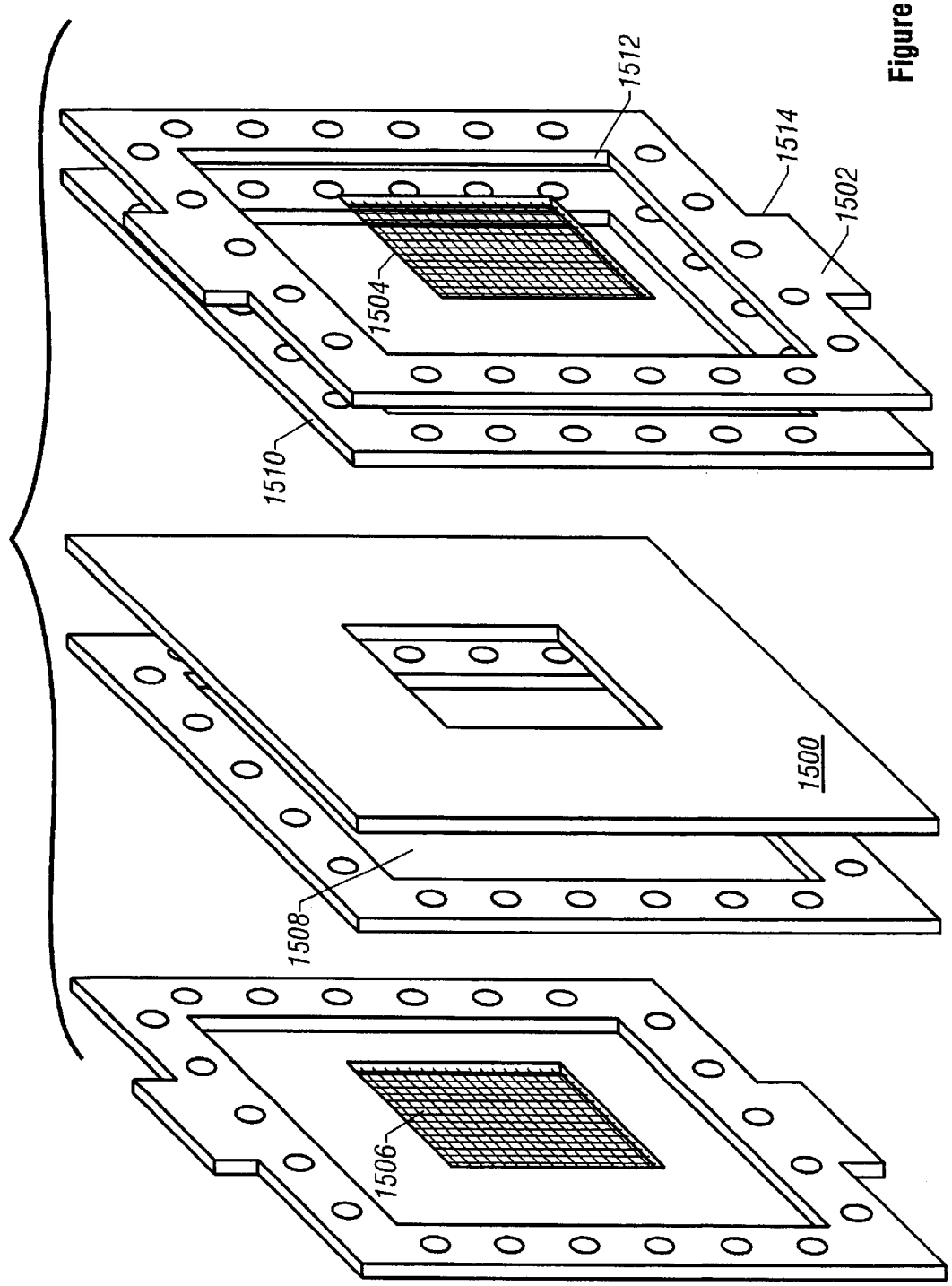

DIRECT METHANOL FEED FUEL CELL AND SYSTEM

This is a divisional of U.S. application Ser. No. 09/006,846, filed Jan. 14, 1998 (now U.S. Pat. No. 6,146,781); which is a continuation of U.S. application Ser. No. 08/569,452, filed Dec. 8, 1995 (now U.S. Pat. No. 5,773,162); which is a continuation of U.S. application Ser. No. 08/135,007, filed Oct. 12, 1993 (now U.S. Pat. No. 5,599,638); which is a continuation-in-part of U.S. application Ser. No. 08/478,801, filed Jun. 7, 1995 pending.

FIELD OF THE INVENTION

The present invention relates to direct feed methanol fuel cell improvements for a system that operates without an acid electrolyte or a reformer.

BACKGROUND AND SUMMARY

Transportation vehicles which operate on gasoline-powered internal combustion engines have been the source of many environmental problems. The output products of internal combustion engines cause, for example, smog and other exhaust gas-related problems. Various pollution control measures minimize the amount of certain undesired exhaust gas components. The process of burning, however, inherently produces some exhaust gases.

Even if the exhaust gases could be made totally benign, however, the gasoline based internal combustion engine still relies on non-renewable fossil fuels.

Many groups have searched for an adequate solution to the energy problems.

One possible solution has been fuel cells. Fuel cells chemically react using energy from a renewable fuel material. Methanol, for example, is a completely renewable resource. Moreover, fuel cells use an oxidation/reduction reaction instead of a burning reaction. The end products from the fuel cell reaction are typically mostly carbon dioxide and water.

Some previous methanol fuel cells used a "reformer" to convert the methanol to $H_2$ gas for a fuel cell. Methanol fuel cells used a strong acid electrolyte. The present inventors first proposed techniques which would allow a fuel cell to operate directly from methanol and without an acid electrolyte—a direct feed fuel cell. The subject matter of this improvement is described in our U.S. Pat. No. 5,599,638, the disclosure of which is herewith incorporated by reference to the extent necessary for proper understanding. Since this is the work of the present inventors, of course, there is no admission made here that this patent constitutes prior art against the present invention.

The subject matter of the present invention describes further refinements of such a direct fed fuel cell. Various improvements to the fuel cell structure itself are described herein, based on the inventors' further work on this concept. These improvements include improved formulations for the electrode which improve its operation.

The electrode operation includes an improved catalyst, which improves the efficiency of methanol production. Fuel cells use an expensive platinum catalyst. The electrode formulations given herein define techniques which reduce or obviate the need for the platinum catalyst.

Techniques for forming the cathode electrode are also described herein. These techniques optimize the operation of the cathode for use with non-pressurized air. This even further improves the efficiency of the fuel cell by allowing ambient temperature and atmospheric pressure air as the reduction mechanism.

Formation techniques for the electrodes are also described, including techniques to condition the membrane. A formation of a particularly preferred membrane electrode assembly is also defined. The present invention also defines flow field designs which facilitate supplying the liquid fuel to the catalyst.

The fuel cell system eventually needs to be used in a final product. This final product could be an internal combustion engine or could be much simpler electronic devices, such as a radio. Any electrically-driven product could operate based on electrical power produced from these fuel cells. The inventors of the present invention have discovered certain techniques to improve the operation and ameliorate these problems which might otherwise exist.

The techniques of the present invention also enable a "system operation" by describing techniques to operate the fuel cell as part of an overall system.

These system techniques includes sensors for measuring methanol concentration and other important parameters. The inventors realized that various sensors for various parameters would be necessary. The inventors could not find a commercial sensor. The present invention describes a way of modifying the techniques which they use in their fuel cell to form a sensor. This sensor operates with high reliability using the techniques of this fuel cell.

Another technique defines formation of monopolar cells.

BRIEF DESCRIPTION OF THE DRAWINGS

These and other aspects of the invention will now be described in detail with reference to the accompanying drawings, wherein:

FIG. 7 shows a first embodiment of the structure of the biplate of the present invention;

FIG. 8 shows a second embodiment of the biplate structure;

FIG. 15 shows a second embodiment of the monopolar approach in expanded view;

DESCRIPTION OF THE PREFERRED EMBODIMENT

The liquid feed system described in our above noted patent uses a platinum-ruthenium catalyst on the anode and a platinum catalyst on the cathode. A perfluorsulfonic acid membrane, preferably DuPont's NAFION™ 117 tetrafluoroethylene-perfluorovinyl ether sulfonic acid copolymer, is used as the polymer electrolyte membrane.

Importantly, this system operated without the necessity for any acid electrolyte, or reformer. Various characteristics of various materials were changed to allow this improvement.

The anode electrode was made more hydrophilic using an ionomeric additive to improve access of the methanol water solutions to the anode surface.

An alternative way of making the anode more hydrophilic was to use an electrolyte which included a super acid ("a C8 acid").

Alternative methanol derivative fuels, such as trimethoxymethane "TMM", reduce fuel crossover due to their increased molecule size, and other characteristics.

Figure 1:
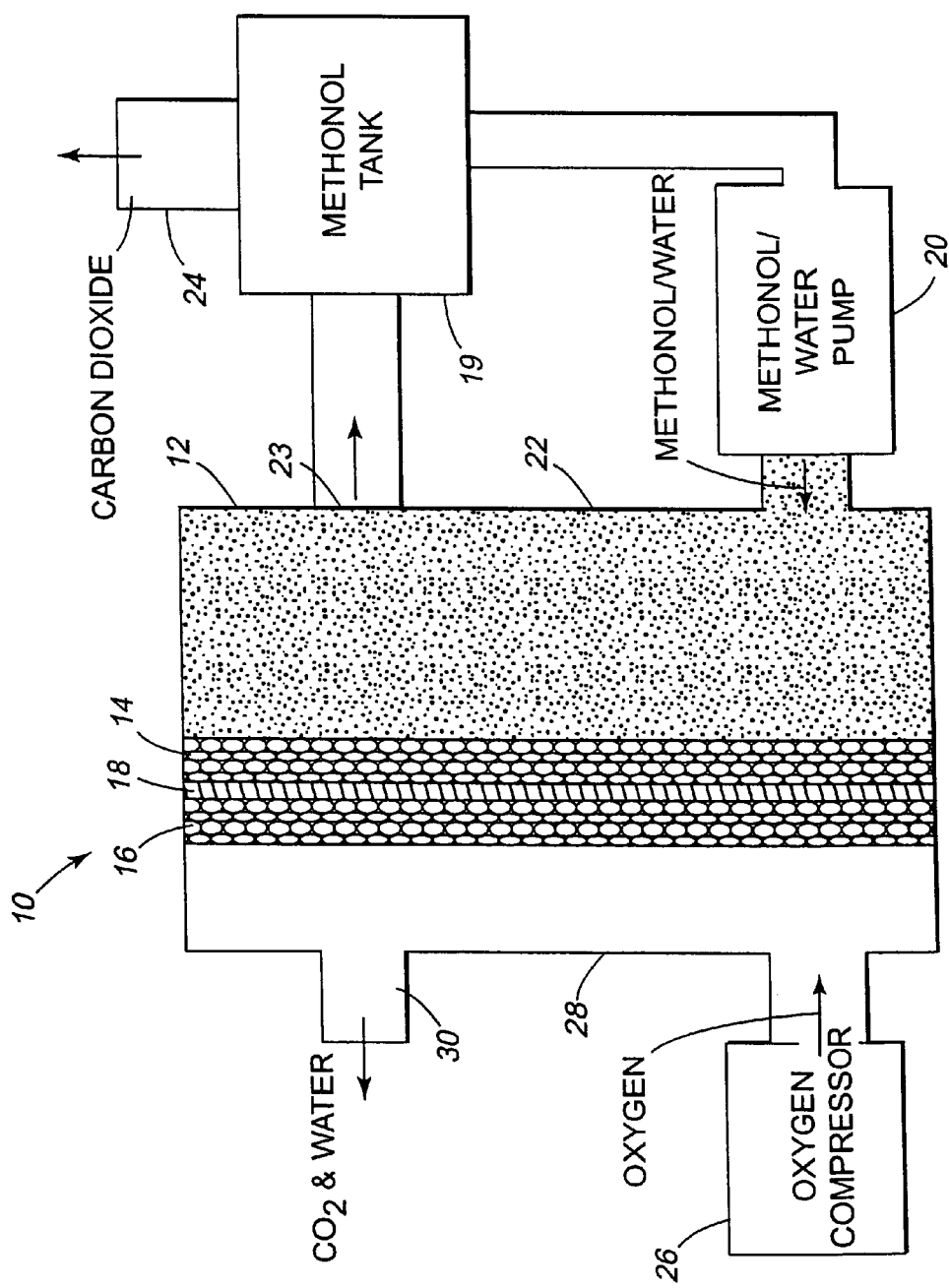
FIGS. 1 and 2 show a basic fuel cell according to the present invention.
Figure 2:
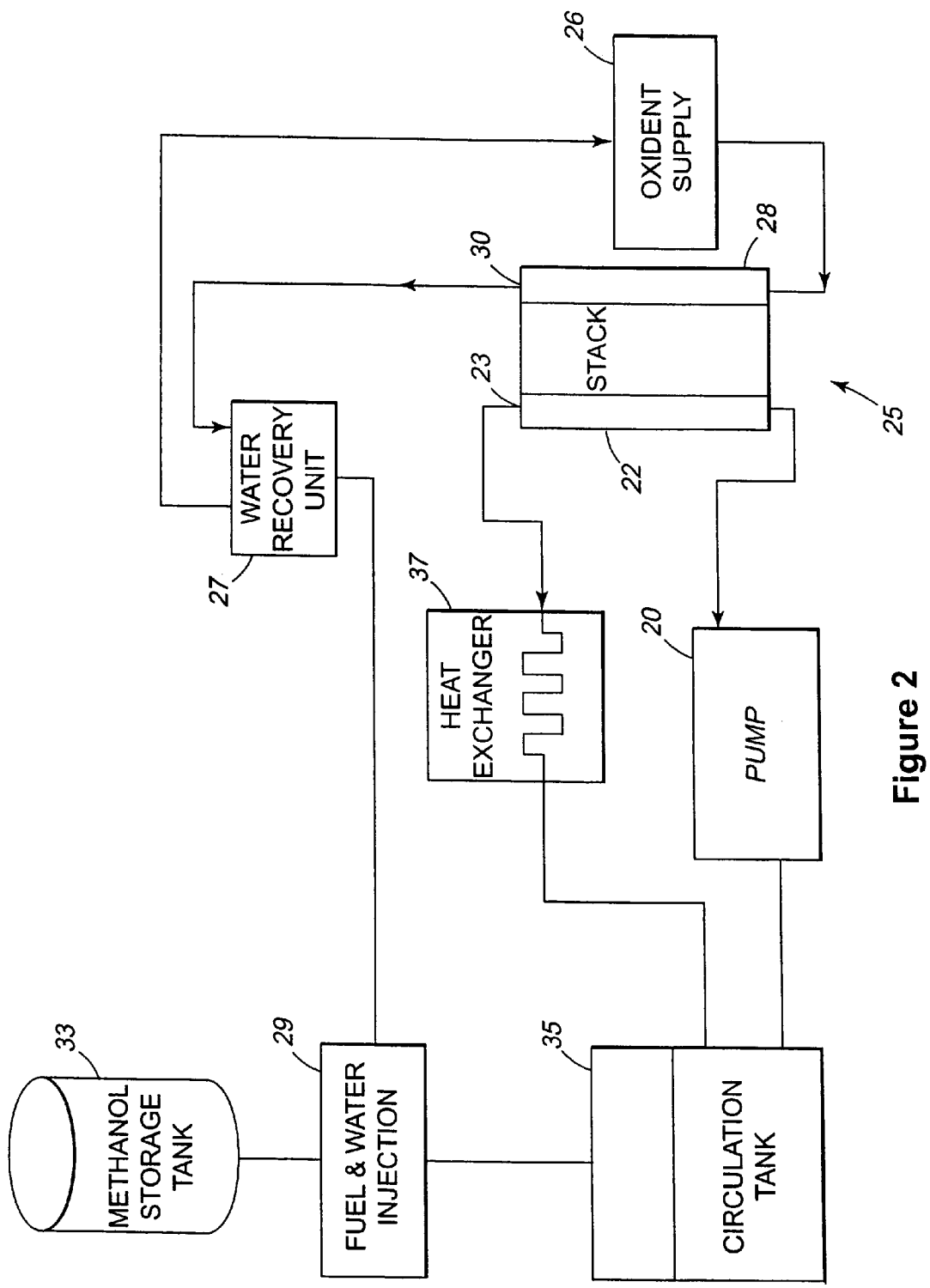

FIG. 1 illustrates a liquid feed organic fuel cell 10 having a housing 12, an anode 14, a cathode 16 and a solid polymer proton-conducting cation-exchange electrolyte membrane 18. As will be described in more detail below, anode 14, cathode 16 and solid polymer electrolyte membrane 18 are preferably a single multi-layer composite structure, referred to herein as a membrane-electrode assembly. A pump 20 is provided for pumping an organic fuel and water solution into an anode chamber 22 of housing 12. The organic fuel and water mixture is withdrawn through an outlet port 23 and is re-circulated through a re-circulation system described below with reference to FIG. 2 which includes a methanol tank 19. Carbon dioxide formed in the anode compartment is vented through a port 24 within tank 19. An oxygen or air compressor 26 is provided to feed oxygen or air into a cathode chamber 28 within housing 12. FIG. 2, illustrates a fuel cell system incorporating a stack 25 of individual fuel cells including the recirculation system, which includes a heat exchanger 37 receiving the output from the anode outlet port 23 of the stack 25, fuel/water circulation tank 35 and a pump 20 to inject a fuel and water solution into the anode chamber 22 of the stack 25. Methanol from a methanol storage tank 33 enters a fuel and water injection system 29, which provides an input stream to the circulation tank 35. An oxidant supply system 26 supplies air or oxygen to the cathode chamber 28 of the stack 25. Carbon dioxide and water emitted from the cathode chamber 28 at outlet 30 are provided to a water recovery unit 27, which in turn supplies water to the fuel/water injection system 29. The following detailed description of the fuel cell of FIG. 1 primarily focuses on the structure and function of anode 14, cathode 16 and membrane 18.

Prior to use, anode chamber 22 is filled with the organic fuel and water mixture and cathode chamber 28 is filled with air or oxygen. During operation, the organic fuel is circulated past anode 14 while oxygen or air is pumped into chamber 28 and circulated past cathode 16. When an electrical load (not shown) is connected between anode 14 and cathode 16, electro-oxidation of the organic fuel occurs at anode 14 and electro-reduction of oxygen occurs at cathode 16. The occurrence of different reactions at the anode and cathode gives rise to a voltage difference between the two electrodes. Electrons generated by electro-oxidation at anode 14 are conducted through the external load (not shown) and are ultimately captured at cathode 16. Hydrogen ions or protons generated at anode 14 are transported directly across membrane electrolyte 18 to cathode 16. Thus, a flow of current is sustained by a flow of ions through the cell and electrons through the external load.

As noted above, anode 14, cathode 16 and membrane 18 form a single composite layered structure. In a preferred implementation, membrane 18 is formed from NAFION™ tetrafluoroethylene-perfluorovinyl ether sulfonic acid copolymer, a perfluorinated proton-exchange membrane material NAFION™ tetrafluoroethylene-perfluorovinyl ether sulfonic acid copolymer is a co-polymer of tetrafluoroethylene and perfluorovinylether sulfonic acid. Other membrane materials can also be used. For example, membranes of modified perflourinated sulfonic acid polymer, polyhydrocarbon sulfonic acid and composites of two or more kinds of proton exchange membranes can be used.

Anode 14 is formed from platinum-ruthenium alloy particles either as fine metal powders, i.e. "unsupported", or dispersed on high surface area carbon, i.e. "supported". The high surface area carbon may be material such as VULCAN XC-72A, provided by Cabot Inc., USA. A carbon fiber sheet backing (not shown) is used to make electrical contact with the particles of the electrocatalyst. Commercially available TORAY™ carbon fiber paper is used as the electrode backing sheet. A supported alloy electrocatalyst on a TORAY™ carbon fiber paper backing is available from E-Tek, Inc., of Framingham, Massachusetts. Alternately, both unsupported and supported electrocatalysts may be prepared by chemical methods, combined with TEFLON™ polytetrafluoroethylene binder and spread on TORAY™ carbon fiber paper backing to produce the anode. An efficient and time-saving preferred method of fabrication of electrocatalytic electrodes is described in detail hereinbelow.

Platinum-based alloys in which a second metal is either tin, iridium, osmium, or rhenium can be used instead of platinum-ruthenium. In general, the choice of the alloy depends on the fuel to be used in the fuel cell. Platinum-ruthenium is preferable for electro-oxidation of methanol. For platinum-ruthenium, the loading of the alloy particles in the electrocatalyst layer is preferably in the range of 0.5–4.0 mg/cm$^2$. More efficient electro-oxidation is realized at higher loading levels, rather than lower loading levels.

Cathode 16 is a gas diffusion electrode in which platinum particles are bonded to one side of membrane 18. Cathode 16 is preferably formed from unsupported or supported platinum bonded to a side of membrane 18 opposite to anode 14. Unsupported platinum black (fuel cell grade) available from Johnson Matthey Inc., USA or supported platinum materials available from E-Tek Inc., USA are suitable for the cathode. As with the anode, the cathode metal particles are preferably mounted on a carbon backing material. The loading of the electrocatalyst particles onto the carbon backing is preferably in the range of 0.5–4.0 mg/cm$^2$. The electrocatalyst alloy and the carbon fiber backing contain 10–50 weight percent TEFLON™ polytetrafluoroethylene to provide hydrophobicity needed to create a three-phase boundary and to achieve efficient removal of water produced by electro-reduction of oxygen.

During operation, a fuel and water mixture (containing no acidic or alkaline electrolyte) in the concentration range of 0.5–3.0 mole/liter is circulated past anode 14 within anode chamber 22. Preferably, flow rates in the range of 10–500 ml/min. are used. As the fuel and water mixture circulates past anode 14, the following electro-chemical reaction, for an exemplary methanol cell, occurs releasing electrons:

Anode:   (1)

Carbon dioxide produced by the above reaction is withdrawn along with the fuel and water solution through outlet 23 and separated from the solution in a gas-liquid separator (see FIG. 2). The fuel and water solution is then re-circulated into the cell by pump 20.

Simultaneous with the electrochemical reaction described in equation 1 above, another electrochemical reaction involving the electro-reduction of oxygen, which captures electrons, occurs at cathode 16 and is given by:

$$\text{Cathode: } O_2 + 4H^+ + 4e^- \rightarrow H_2O \quad (2)$$

The individual electrode reactions described by equations 1 and 2 result in an overall reaction for the exemplary methanol fuel cell given by:

$$\text{Cell: } CH_3OH + 1.5O_2 \rightarrow CO_2 + 2H_2O \quad (3)$$

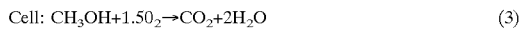

At sufficiently high concentrations of fuel, current densities greater than 500 mA/cm can be sustained. However, at these concentrations, a crossover rate of fuel across membrane 18 to cathode 16 increases to the extent that the efficiency and electrical performance of the fuel cell are a-reduced significantly. Concentrations below 0.5 mole/liter restrict cell operation to current densities less than 100 mA/cm$^2$. Lower flow rates have been found to be applicable at lower current densities. High flow rates are required while operating at high current densities to increase the rate of mass transport of organic fuel to the anode as well as to remove the carbon dioxide produced by electrochemical reaction. Low flow rates also reduce the crossover of the fuel from the anode to the cathode through the membrane.

Preferably, oxygen or air is circulated past cathode 16 at pressures in the range of 10 to 30 psig. Pressures greater than ambient improve the mass transport of oxygen to the sites of electrochemical reactions, especially at high current densities. Water produced by electrochemical reaction at the cathode is transported out of cathode chamber 28 by flow of oxygen through port 30.

In addition to undergoing electro-oxidation at the anode, the liquid fuel which is dissolved in water permeates through solid polymer electrolyte membrane 18 and combines with oxygen on the surface of the cathode electrocatalyst. This process is described by equation 3 for the example of methanol. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. It is therefore desirable to minimize the rate of fuel crossover. The rate of crossover is proportional to the permeability of the fuel through the solid electrolyte membrane and increases with increasing concentration and temperature. By choosing a sold electrolyte membrane with low water content, the permeability of the membrane to the liquid fuel can be reduced. Reduced permeability for the fuel results in a lower cross-over rate. Also, fuels having a large molecular size have a smaller diffusion coefficient than fuels which have small molecular size. Hence, permeability can be reduced by choosing a fuel having a large molecular size. While water soluble fuels are desirable, fuels with moderate solubility exhibit lowered permeability. Fuels with high boiling points do not vaporize and their transport through the membrane is in the liquid phase. Since the permeability for vapors is higher than liquids, fuels with high boiling points generally have a low crossover rate. The concentration of the liquid fuel can also be lowered to reduce the crossover rate. With an optimum distribution of hydrophobic and hydrophilic sites, the anode structure is adequately wetted by the liquid fuel to sustain electrochemical reaction and excessive amounts of fuel are prevented from having access to the membrane electrolyte. Thus, an appropriate choice of anode structures can result in the high performance and desired low crossover rates.

Because of the solid electrolyte membrane is permeable to water at temperatures greater than 60° C., considerable quantities of water are transported across the membrane by permeation and evaporation. The water transported through the membrane is condensed in a water recovery system and fed into a water tank see FIG. 2) so that the water can be re-introduced into anode chamber 22.

Protons generated at anode 14 and water produced at cathode 16 are transported between the two electrodes by proton-conducting solid electrolyte membrane 18. The maintenance of high proton conductivity of membrane 18 is important to the effective operation of an organic/air fuel cell. The water content of the membrane is maintained by providing contact directly with the liquid fuel and water mixture. The thickness of the proton-conducting solid polymer electrolyte membranes should preferably be in the range from 0.05–0.5 mm. Membranes thinner than 0.05 mm may result in membrane electrode assemblies which are poor in mechanical strength, while membranes thicker than 0.5 mm may suffer extreme and damaging dimensional changes induced by swelling of the polymer by the liquid fuel and water solutions and also exhibit excessive resistance. The ionic conductivity of the membranes should be greater than 1 ohm$^{-1}$ cm$^{-1}$ for the fuel cell to have a tolerable internal resistance.

As noted above, the membrane should have a low permeability to the liquid fuel. Although a NAFION™ tetrafluoroethylene-perfluorovinyl ether sulfonic acid copolymer membrane has been found to be effective as a proton-conducting solid polymer electrolyte membrane, perfluorinated sulfonic acid polymer membranes such as ACIPLEX™ perfluorinated sulfonic acid polymer membranes (manufactured by Asahi Glass Co., Japan) and polymer membranes made by Dow Chemical Co., Japan) and polymer membranes made by Dow Chemical Co., USA, such as XUS13204.10™ membrane which are similar to properties to NAFION™ tetrafluoroethylene-perfluorovinyl ether sulfonic acid copolymer are also applicable. Membranes of polyethylene and polypropylene sulfonic acid, polystyrene sulfonic acid and other polyhydrocarbon-based sulfonic acids (such as membranes made by RAI Corporation, USA) can also be used depending on the temperature and duration of fuel cell operation. Composite membranes consisting of two or more types of proton-conducting cation-exchange polymers with differing acid equivalent weights, or varied chemical composition (such as modified acid group or polymer backbone), or varying water contents, or differing types and extent of cross-linking (such as cross linked by multivalent cations e.g., Al 3+, Mg 2+etc.,) can be used to achieve low fuel permeability. Such composite membranes can be fabricated to achieve high ionic conductivity, low permeability for the liquid fuel and good electrochemical stability.

As can be appreciated from the foregoing description, a liquid feed direct oxidation organic fuel cell is achieved using a proton-conducting solid polymer membrane as electrolyte without the need for a free soluble acid or base electrolyte. The only electrolyte is the proton-conducting solid polymer membrane. No acid is present in free form in the liquid fuel and water mixture. Since no free acid is present, acid-induced corrosion of cell components, which can occur in current-art acid based organic/air fuel cells, is avoided. This offers considerable flexibility in the choice of materials for the fuel cell and the associated sub-systems. Furthermore, unlike fuel cells which contain potassium hydroxide as liquid electrolyte, cell performance does not degrade because soluble carbonates are not formed. A solid electrolyte membrane also minimizes parasitic shunt currents.

Further Improvements

The reactions of the direct methanol/liquid-fed fuel cell are as follows:

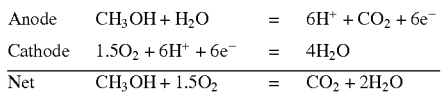

| Anode | $CH_3OH + H_2O$ | = | $6H^+ + CO_2 + 6e^-$ |
|---|---|---|---|
| Cathode | $1.5O_2 + 6H^+ + 6e^-$ | = | $4H_2O$ |
| Net | $CH_3OH + 1.5O_2$ | = | $CO_2 + 2H_2O$ |

The present specification describes various improvements in manufacturing and forming the preferred structure and materials used according the present invention.

Various experiments carried out by the inventors have ascertained that one particular preferred catalyst material is platinum-ruthenium ("Pt—Ru"). Various formulations allowing combination of those two metals are possible. The inventors found that a bimetallic powder, having separate platinum particles and separate ruthenium particles produced a better result than a platinum-ruthenium alloy. The preferred Pt—Ru material used according to the present invention has a high surface area to facilitate contact between the material and the fuels. Both platinum and ruthenium are used in the catalytic reaction, and the inventors found that it was important that the platinum and ruthenium compounds be uniformly mixed and randomly spaced throughout the material, i.e., the material must be homogeneous.

A first aspect of the present invention combines different metals to form a platinum-ruthenium bimetallic powder which has distinct sites of different materials. While there is some combination between the particles, the techniques of the present invention ensure that the extent of combination is minimal.

The process of forming the preferred materials is described herein. First, a slurry of platinum salts and ruthenium salts in hydrochloric acid is formed.

A chloroplatinic acid hexahydrate salt H2 PtCl$_6$.6H$_2$O is formed by dissolving chloroplatinic acid crystals in hydrochloric acid.

A ruthenium salt K2RuCl$_5$.H$_2$O is formed from potassium pentachloroaquoruthenium (III).

12.672 grams of chloroplatinic acid crystals are mixed with 13.921 grams of potassium pentachloroaquoruthenium crystals and 600 ml of 1 molar hydrochloric acid. The mixture of acid and salt is stirred for 15 to 30 minutes to obtain a homogeneous mixture.

The acid slurry is then neutralized and precipitated by addition of 140 grams of sodium carbonate (Na$_2$CO$_3$) per ml per minute at between 20–30° C. During this time, carbon dioxide will vigorously evolve from the solution. The sodium carbonate is continuously added until the gas evolution ceases. At this time, the solution turns brown-black. The inventors found that this took about 15 minutes.

Maintaining proper pH during this operation is important—the pH should be maintained at around 9.25 by the slow addition of sodium carbonate.

The "grey powdery mass" is then processed to evaporate water from the slurry. The evaporation takes between 1 and 2 hours and eventually forms a black gluey solid with dry lumps of the material. The black gluey solid is then dried in a vacuum or in flowing nitrogen at 80 to 100° C. A lumpy grey solid is obtained. This solid includes materials which are still in solution with the sodium chloride.

The chemical content of the grey powdery mass Ruthenium hydroxide—Ru(OH)$_3$, Platinum hydroxide—Pt(OH)$_4$ and "gunk" or chlorides, plus excess Na$_2$CO$_3$.

The inventors postulate that these extra materials maintain the separation between the platinum and the ruthenium. If the materials were maintained alone, they would sinter, causing them to join and increase particle size. The carbonate buffer between the particles prevents coalescing.

This lumpy solid material is then reduced in a hydrogen and argon atmosphere to reduce the salt to a metal. The material is transferred into a glass boat. The boat is placed in the center of a glass tube of a tubular furnace. In a gaseous mixture of 7% hydrogen, 93% argon or alternatively in a mixture of hydrogen/nitrogen, the material is reduced at around 225° C. The gas should be flowing over the boat at a rate of 50 to 200 ml per minute.

The gas flow is maintained in the heated atmosphere for 14 hours. Then, with hydrogen still flowing over the powder, the catalyst powder is allowed to cool to around 40° C. This forms a mixture of particles of platinum, ruthenium, plus other chlorides and carbonates.

The resulting material must then be washed. The material takes several washes, e.g. six washes at 60° C. Each wash transfers the sample in the glass boat to a beaker having 1 liter of de-ionized water at 60° C.

Platinum-ruthenium is water insoluble. Hence, the washings do not effect the platinum ruthenium materials, and only removes the other materials. Each washing includes stirring the water solution for 15 minutes, to dissolve the soluble chlorides and carbonates. Since the metal particles are of submicron size, they do not settle to the bottom, but instead form a colloidal mixture.

The solution is allowed to cool to 40° C. The solution is later centrifuged at 3000 rpm for one hour. The centrifuging process leaves a clear supernatant liquid. The supernatant liquid is transferred off, and the black sediment is transferred to a flask having 1 liter of 600 deionized water. This further washing removes any dissolved chlorides.

This washing process is repeated a total of six times. It has been found that stirring the water and centrifuging is important for total removal of the chlorides. These chlorides are harmful to catalyst performance. However, the inventors found that these chlorides are a necessary binder to minimize the material coalescing but should be removed later.

After the final centrifuging operation, the powder is transferred to a beaker and dried in a vacuum oven at 60° C. for three hours. Alternatively, the material can be freeze-dried. This results in a free-flowing submicron size active platinum-ruthenium catalyst. It is important to note that the dried materials have submicron sizes and hence they can easily become airborne. A submicron mask must be worn to ensure safety.

The active catalyst powder has been found to include a homogeneous mixture of submicron size platinum particles and ruthenium particles. There are also some trace residuals of RuO$_2$, ruthenium oxide, and ruthenium alloy.

This powder is used as a catalyst on the anode as described herein.

The platinum salt and ruthenium salt which are the initial products of this conversion can also be modified by adding titanium dioxide (TiO$_2$), iridium (Ir) and/or osmium (Os). These materials can be used to improve the fuel cell performance at relatively nominal cost.

A comparison with the prior art particles shows the significant advantages of this process. The prior art particles form 5 micron size particles. These particles included ruthenium dioxide. An analysis of the particles of the present invention shows a homogeneous mixture down to the point of micron particle size. Under a scanning electron microscope there are no bright and dull spots- all materials appear to be totally grey. This shows that the mixing process has formed a totally homogeneous material.

The material prepared according to this process is called anode catalyst material. Further processing of this anode catalyst by combining with nafion solution, etc. results in an "ink". As described herein, this includes a combination of platinum metal and ruthenium metal. The inventors have found the preferred ratio of platinum to ruthenium can be between 60/40 and 40/60. The best performance is believed to occur at 60% platinum, 40% ruthenium. Performance degrades slightly as the catalyst becomes 100% platinum. It degrades more sharply as the catalyst becomes 100% ruthenium.

Other additions are added to the salt to improve characteristics and to replace the catalyst materials by other less-expensive materials. The inventors realized that this fuel cell must be formed from inexpensive material. Unfortunately, platinum is an extremely expensive material. As of today's writing, platinum-ruthenium is the best material for the catalyst. The inventors have investigated using replacements for all or part of the platinum in the catalyst. The substitution is based on the way that the platinum-ruthenium catalyst works.

The reaction which occurs at the anode is $CH_3OH+H_2O \rightarrow CO2+H^++e^-$. The inventors believe that platinum-ruthenium catalyzes this reaction by aiding in disassociating the materials on the catalyst surface. The __,. material draws the electrons out, and allows them to disassociate. The reaction can be explained as follows.

Methanol is a carbon compound. The carbon atom is bound to four other atoms. Three of the bonds are to hydrogen atoms. The other bond is to a hydroxyl, OH, group. The platinum disassociates methanol from its hydrogen bonds, to form:
M=C—OH (M is the Pt or other metal site catalyst)+$3H^+$.
The ruthenium disassociates the hydrogen from the water molecule (HOH) to form M—OH. These surface species then reassemble as $CO_2+6H^++6e^-$. The $H^+$ (protons) are produced at the anode, and cross the anode to the cathode where they are reduced. This is called a bifunctional catalyst.

Any material which has a similar function of disassociating the methanol and water as described can be used in place of the platinum. The inventors have investigated several such materials. They found alternatives to platinum including palladium, tungsten, Rhodium, Iron, Cobalt, and Nickel which are capable of dissociating C—H bonds. Molybdenum ($MoO_3$), niobium ($Nb_2O_5$), zirconium ($ZbO_2$), and rhodium (Rh) may also be capable of dissociating H—OH as M—OH. A combination of these are therefore good catalysts. The catalyst for dissociating the H—O—H bonds preferably includes Ru, Ti, Os, Ir, Cr, and/or Mn.

Ruthenium can be replaced either wholly or partly by a ruthenium-like material. The inventors found that iridium has many characteristics which are similar to ruthenium. A first embodiment of this aspect, therefore, uses a combination of platinum, ruthenium and iridium in the relative relationship 50-25-25. This adds the salt $H_2IrCl_6 \cdot H_2O$ to the initial materials described above, in appropriate amounts to make a 50-25-25 (Pt—Ru—Ir) combination.

It has been found that this catalyst also operates quite well, using less ruthenium.

Another material which has been found to have some advantages is material including titanium compounds. Any titanium alkoxide or titanium butoxide, e.g. titanium isopropoxide or $TiCl_4$—can also be added to the original mixture. This forms an eventual combination of platinum-ruthenium—$TiO_2$, also formed in a 50-25-25 (Pt—Ru—$TiO_2$) combination.

Platinum-ruthenium-osmium is also used. Osmium is added to the mixture as a salt $H_2OsCl_6 \cdot 6H_2O$, and has also been found to produce advantageous properties.

However formed, these materials used to form the platinum ink must be applied to the anode. Various techniques can be used to apply this material. Formation of the anode, therefore, is described next.

Carbon Paper Formation

Fuel crossover is a source of inefficiency in this fuel cell. Fuel crossover in this fuel cell occurs when methanol passes through the anode instead of reacting at the anode. The methanol passes through the anode, the membrane electrode assembly, through the membrane and then through the cathode. The methanol may react at the cathode: this lowers the efficiency of the fuel.

The electrodes of the present invention are preferably formed using a base of carbon paper. The starting material point is TGPH-090™ carbon paper available from Toray, 500 Third Avenue, New York, N.Y. This paper, however, is first pre-processed to improve its characteristics. The pre-processing uses a DuPont "TEFLON™ 30 polytetrafluoroethylene" suspension of about 60% solids.

The paper can alternately be chopped carbon fibers mixed with a binder. The fibers are rolled and then the binder is burned off to form a final material which is approximately 75% porous. Alternately, a carbon cloth paper could be used. This will be processed according to the techniques described herein. Alternately, a carbon paper cloth could be used. This will be processed according to the techniques described herein to form a gas diffusion/ current collector backing.

The preferably processed carbon paper includes paper within embedded TEFLON™ polytetrafluoroethylene particles. The spaces between the TEFLON™ polytetrafluoroethylene particles should preferably be small enough to prevent methanol from passing therethrough. Even better characteristics are used when other methanol derivatives, such as TMM are used. The anode assembly is formed on a carbon paper base. This carbon paper is coated with TEFLON™ polytetrafluoroethylene, meaning that TEFLON™ polytetrafluoroethylene is added to improve its properties. The inventors have found that there is an important tradeoff between the amount of TEFLON™ polytetrafluoroethylene which is added to the paper and its final characteristics.

It is important to maintain a proper balance of the amount of TEFLON™ polytetrafluoroethylene used, as described herein.

The paper is coated with TEFLON™ polytetrafluoroethylene to make it water repellent, and to keep the platinum ink mix from seeping through the paper. The paper needs to be wettable, but not porous. This delicate balance is followed by dipping and heating the paper. The inventors found a tradeoff between the degree of wettability of the paper and the amount of impregnation into the paper, which is described herein.

First, the TEFLON™ polytetrafluoroethylene emulsion must be diluted. One gram of TEFLON™ 30 polytetrafluoroethylene is added to each 17.1 grams of water. One gram of TEFLON™ 30 polytetrafluoroethylene of weight 60% corresponds to 60 grams of TEFLON™ polytetrafluoroethylene per 100 ml. This material is poured into a suitable container such as a glass dish. The carbon paper is held in the material until soaked.

The soaking operation corresponds to weighing a piece of carbon paper, then dipping it into the solution for about 10 seconds or until obviously wet. The carbon paper is removed from the solution with tweezers, making as little contact with the paper as possible. However, the characteristics of TEFLON™ polytetrafluoroethylene are such that the tweezers themselves will attract the TEFLON™ polytetrafluoroethylene, and cause an uneven distribution of fluid. TEFLON™ polytetrafluoroethylene-covered tweezers are used to minimize this possibility. The carbon paper is held with a corner pointing down, to allow excess solution to drain off.

Figure 3:
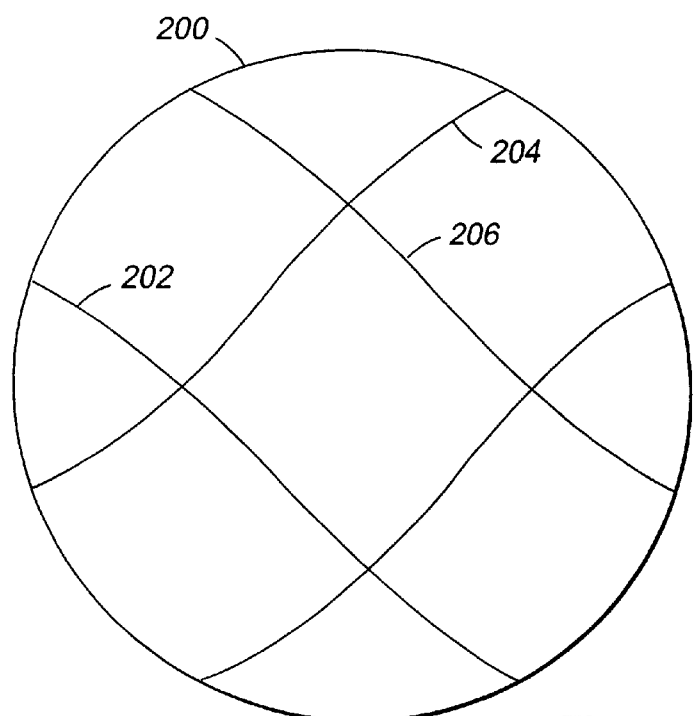
FIG. 3 shows the drying dish used for drying teflon encoded carbon paper sheets.

TEFLON™ polytetrafluoroethylene emulsion's surface tension characteristics are such that if the material were laid on a glass surface, a lot of the teflon would be dragged out by surface tension. Instead, a paper-drying assembly is formed as shown in FIG. 3. A plurality of TEFLON™ polytetrafluoroethylene covered wires 202 are stretched over a catchbasin such as a dish 200. The stretched wires form two sets of orthogonally-extending supports 202 and 204. The carbon paper which has just been treated with TEFLON™ polytetrafluoroethylene solution is held across these supports.

Ideally, the wires are TEFLON™ polytetrafluoroethylen-coated wires having a diameter of 0.43 inches. While these dimensions are not critical, a smaller amount of contact with the paper makes the suspension distribution on the wire more even. Kinks 206 are formed in the wires to prevent the carbon paper from touching the wires all along its length and hence further minimize the area of contact.

The paper-drying assembly shown in FIG. 3 is then placed into an oven at 70° C. for one hour. The treated carbon papers are removed from the dish after drying, and placed into glass containers. These are then sintered in a furnace oven at 360° C. for one hour. A properly processed paper will have its weight increased by 5% over the course of this process. More generally, any weight increase between 3 and 20% is acceptable. The paper is weighed to determine if enough absorption has occurred and/or if further paper processing will be necessary.

This substrate plus a catalyst layer forms the eventual electrode.

Two preferred techniques of application of the catalyst including layer are described herein: a direct application and a sputtering application. Both can use the special carbon paper material whose formation was described above, or other carbon paper including carbon paper which is used without any special processing. The direct application technique of the present invention mixes materials with the platinum-ruthenium material described above or any other formulation, more generally, catalyst materials. The catalyst materials are processed with additional materials which improve the characteristics.

Platinum-ruthenium powder is mixed with an ionomer and with a water repelling material. The preferred materials include a solution of perfluorsulfonic acid NAFION™ tetrafluoroethylene-perfluorovinyl ether sulfonic acid copolymer and TEFLON™ polytetrafluoroethylene microparticles. 5 grams of platinum-ruthenium powder are added per 100 ml of NAFION™ tetrafluoroethylene-perfluorovinyl ether sulfonic acid copolymer in solvent.

A DuPont T-30 mix of 60% TEFLON™ polytetrafluoroethylene solid by weight appropriately diluted is added. These TEFLON™ polytetrafluoroethylene micro-particles are then mixed. Preferably, a dilute TEFLON™ 30 polytetrafluoroethylene suspension of 12 weight percent solids including 1 gram of TEFLON™ 30 polytetrafluoroethylene concentrate to 4 grams of de-ionized water is made. 300 mg of de-ionized water is added to 350 mg of the 12 weight % TELFON™ polytetrafluoroethylene solution described above. 144 mg of platinum-ruthenium is mixed to this solution. The resultant mixture is then mixed using an ultrasonic mixing technique—known in the art as "sonicate". The ultrasonic mixing is preferably done in an ultrasonic bath filled with water to a depth of about ¼ inch. The mixture is "ultrasonicated" for about 4 minutes.

It is important that the TELFON™ polytetrafluoroethylene must first be mixed with the platinum-ruthenium as described above to form about 15% by weight TELFON™ polytetrafluoroethylene. Only after this mixture is made can the NAFION™ tetrafluoroethylene-perfluorovinyl ether sulfonic acid copolymer be added. The inventors have found that if NAFION™ tetrafluoroethylene-perfluorovinyl ether sulfonic acid copolymer is added first, it may surround the particles of platinum and ruthenium. Therefore, the order of this operation is critically important. At this point, 0.72 grams of 5 weight % NAFION™ tetrafluoroethylene-perfluorovinyl ether sulfonic acid copolymer is added to the jar, which is sonicated again for 4 minutes. More generally, approximately 1 mg of NAFION™ tetrafluoroethylene-perfluorovinyl ether sulfonic acid copolymer needs to be added per square cm of electrode to be covered. The amount of TELFON™ polytetrafluoroethylene described above may also be modified, e.g. by adding only 652 ml of the solution.

This process forms a slurry of black material. This slurry of black material is then applied to the carbon paper. The application can take any one of a number of forms. The simplest form is to paint the material on the carbon paper backing, using alternating strokes in different directions. A small camel hair brush is used to paint this on. The preferred material amounts described above, to form enough catalyst for one side of a 2-inch by 2-inch piece of 5 weight % coated with TELFON™ polytetrafluoroethylene carbon paper. Accordingly, the painting is continued until all the catalyst is used.

A drying time of two to five minutes between coats should be allowed, so that the material is semi-dryed between coats and each coat should be applied in a different direction. The anode needs to then dry for about 30 minutes. After that 30 minutes, the anode must be "pressed" immediately. The pressing operation is described herein.

The resulting structure is a porous carbon substrate used for diffusing gases and liquids, covered by 4 per square cm of catalyst material.

An alternative technique of applying the materials sputters the materials onto the backing.

We have now described how to form the anode. Next, the techniques involved in forming the preferred proton conducting membrane (the NAFION™ tetrafluoroethylene-perfluorovinyl ether sulfonic acid copolymer) and then the techniques in forming the cathode will be described.

Proton Conducting Membrane

The preferred material described herein is NAFION™ 117 tetrafluoroethylene-perfluorovinyl ether sulfonic acid copolymer. However, other materials can also be used to form proton conducting membranes. For example, other perfluorsulfonic acid materials can be used. It is postulated that different materials with carboxylic acid groups can also be used for this purpose.

The preferred embodiment starts with NAFION™ 117 tetrafluoroethylene-perfluorovinyl ether sulfonic acid copolymer, available from DuPont. This material is first cut to the proper size. Proper sizing is important, since the end materials will be conditioned. First, the NAFION™ tetrafluoroethylene-perfluorovinyl ether sulfonic acid copolymer is boiled in a hydrogen peroxide solution. A 5% solution of hydrogen peroxide is obtained, and the membrane is boiled in this solution for 1 hour in 80–90° C. This removes any oxidizable organic impurities.

Following this peroxide boiling step, the membrane is boiled in de-ionized water, at close to 100° C., for 30 minutes. Hydrogen peroxide which was previously adsorbed into the membrane is removed along with other water-soluble organic materials.

The thus-processed membrane is next boiled in a sulfuric acid solution. A one molar solution of sulfuric acid is prepared by diluting commercially available 18-molar concentrated ACS-grade sulfuric acid. The ACS-grade acid should have metal impurities in an amount less than 50 parts per million. The membrane is boiled in the 1-molar sulfuric acid at about 100° C. to more completely convert the material into a proton conducting form.

The processed material is next boiled in de-ionized water at 90–100° C. for thirty minutes. The water is discarded, and this boiling step is repeated three more times to purify the membrane.

After these washings, the membrane is free of sulfuric acid and in completely "protonic" form. The membrane is stored in de-ionized water in a sealed container until it is ready for further processing.

Cathode construction. The cathode is constructed by first preparing a cathode catalyst ink. The cathode catalyst ink is preferably pure platinum, although other inks can be used and other materials can be mixed into the ink as described herein. 250 mg of platinum catalyst is mixed with 0.5 gram of water including 37½ mg of TEFLON™ polytetrafluoroethylene. The mix is sonicated for five minutes and combined with a 5% solution of NAFION™ tetrafluoroethylene-perfluorovinyl ether sulfonic acid copolymer. The mix is again sonicated for five minutes to obtain a uniform dispersal. This forms enough material to cover one piece of 2×2" carbon paper. Unprocessed TORAY™ carbon fiber paper can be used with no TEFLON™ polytetrafluoroethylene therein. However, preferably the material is coated with TEFLON™ polytetrafluoroethylene as discussed above. The procedures are followed to make a 5% TEFLON™ polytetrafluoroethylene impregnated paper. The paper is then heated at 300° C. for one hour to sinter the TEFLON™ polytetrafluoroethylene particles. Catalyst ink is then applied to the paper as described above to cover the material with 4 mg/cm$^2$/g of PT. TEFLON™ polytetrafluoroethylene content of the paper can vary from 3–20%, 5% being the preferred.

Sputtering

An alternative technique of cathode forming forms a sputtered platinum electrode. This sputtered platinum electrode has been found to have significant advantages when used as a plain air electrode. The process of forming the sputtered platinum electrode is described herein.

The cathode electrode carries out a reaction of $O_2 + H^+ + e^- \rightarrow$ water. The $O_2$ is received from the ambient gas around the platinum electrode, while the electron and protons are received through the membrane. This alternative technique for forming the cathode electrode starts with fuel cell grade platinum. This can be bought from many sources including Johnson-Matthey. 20 to 30 gms per square meter of surface area of this platinum are applied to the electrode at a particle size of 0.1 to 1 micron.

A platinum source is a solid rod of material. According to this embodiment, the material is sputtered onto the substrate prepared as described above. The platinum powder is first mixed with aluminum powder. This mixing can be carried out using mechanical means for example, or it can be done using salt combination techniques as described above for the formulation of the anode ink. The platinum-aluminum mixture is sputtered onto the carbon paper backing using any known sputtering technique from the semiconductor arts.

Figure 4:
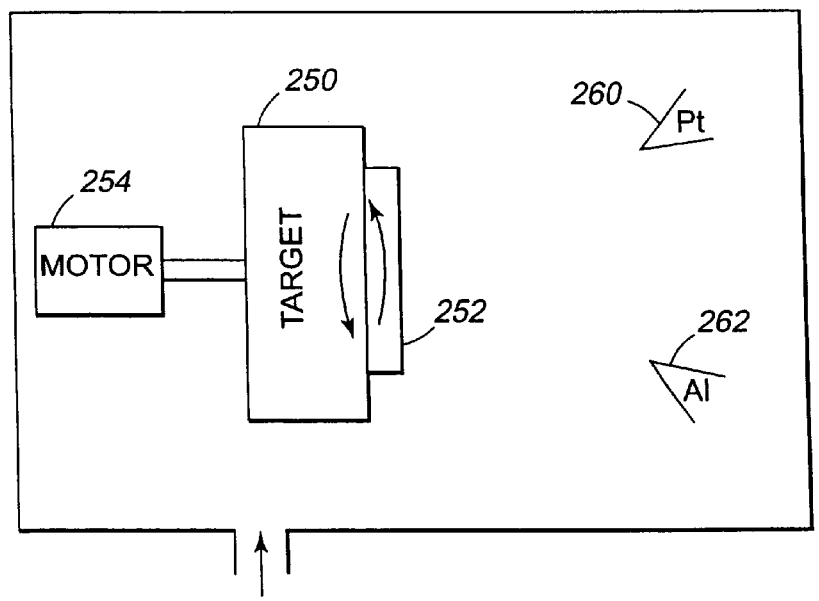
FIG. 4 shows the basic platinum sputtering device of the present invention.

The platinum is sputtered as follows using the system diagrammed in FIG. 4. A standard 4-inch target 250 holds the carbon paper electrode 252. The target is rotated by a motor 254 at one rotation between per 10 seconds. The preferred technique used herein sputters platinum from a first Pt source 260 and aluminum from an Al source 262. The platinum is sputtered to 0.23 amps and the aluminum at 0.15 amps at around 200 volts. The two sources impinge from different directions in opposite sides towards the targets at 45° angles.

The inventors found that 20 Torr was the ideal pressure for this sputtering, although any pressure between 1 to and 50 to could be used. The Argon pressure is about 30 mtorr. However, different argon pressures can be used to form different particle sizes. The sputtering is done for about 8 minutes.

Preferably, once sputtered, the etching is carried out by dipping the sputtered backing into an etching solution, followed by a washing solution followed by dipping.

The sputtered electrode is a mixture of Al and Pt particles on the backing. The electrode is washed with potassium hydroxide (KOH) to remove the aluminum particles. This forms a carbon paper backing with very porous platinum thereon. Each of the areas where the aluminum was formed is removed—leaving a pore space at that location. The inventors found that a thick coating of the Pt—Al material would prevent washing out the Al from some lower areas of the catalyst. The present invention uses a thin coating—preferably a 0.1 micron coating or less with a material density between 0.2 mg per cm$^2$ and 0.5 mg per cm$^2$.

At this point in the processing, we now have an anode, a membrane, and a cathode. These materials are assembled into a membrane electrode assembly ("MEA")

MEA Formation

The electrode and the membranes are first laid or stacked on a CP-grade 5 Mil, 12-inch by 12-inch titanium foil. Titanium foil is used by the present inventors to present any acid content from the membrane from leaching into the foil.

First, the anode electrode is laid on the foil. The proton conducting membrane has been stored wet to maintain its desired membrane properties. The proton conducting membrane is first mopped dry to remove the macro-sized particles. The membrane is then laid directly on the anode. The cathode laid on top of the membrane. Another titanium foil is placed over the cathode.

The edges of the two titanium foils are clipped together to hold the layers of materials in position. The titanium foil and the membrane between which the assembly is to be pressed includes two stainless steel plates which are each approximately 0.25 inches thick.

The membrane and the electrode in the clipped titanium foil assembly is carefully placed between the two stainless steel platens. The two platens are held between jaws of a press such as an arbor press or the like. The press should be maintained cold, e.g. at room temperature.

The press then actuated to develop a pressure between 1000 and 1500 psi, with 1250 psi being an optimal pressure. The pressure is held for 10 minutes. After this 10 minutes of pressure, heating is commenced. The heat is slowly ramped up to about 146° C.; although anywhere in the range of 140–150° C. has been found to be effective. The slow ramping up should take place over 25–30 minutes, with the last 5 minutes of heating being a time of temperature stabilization. The temperature is allowed to stay at 146° C. for approximately 1 minute. At that time, the heat is switched off, but the pressure is maintained.

The press is then rapidly cooled using circulating water, while the pressure is maintained at 1250 psi. When the temperature reaches 45° C., approximately 15 minutes later, the pressure is released. The bonded membrane and electrodes are then removed and stored in de-ionized water.

Flow Field.

Figure 5:
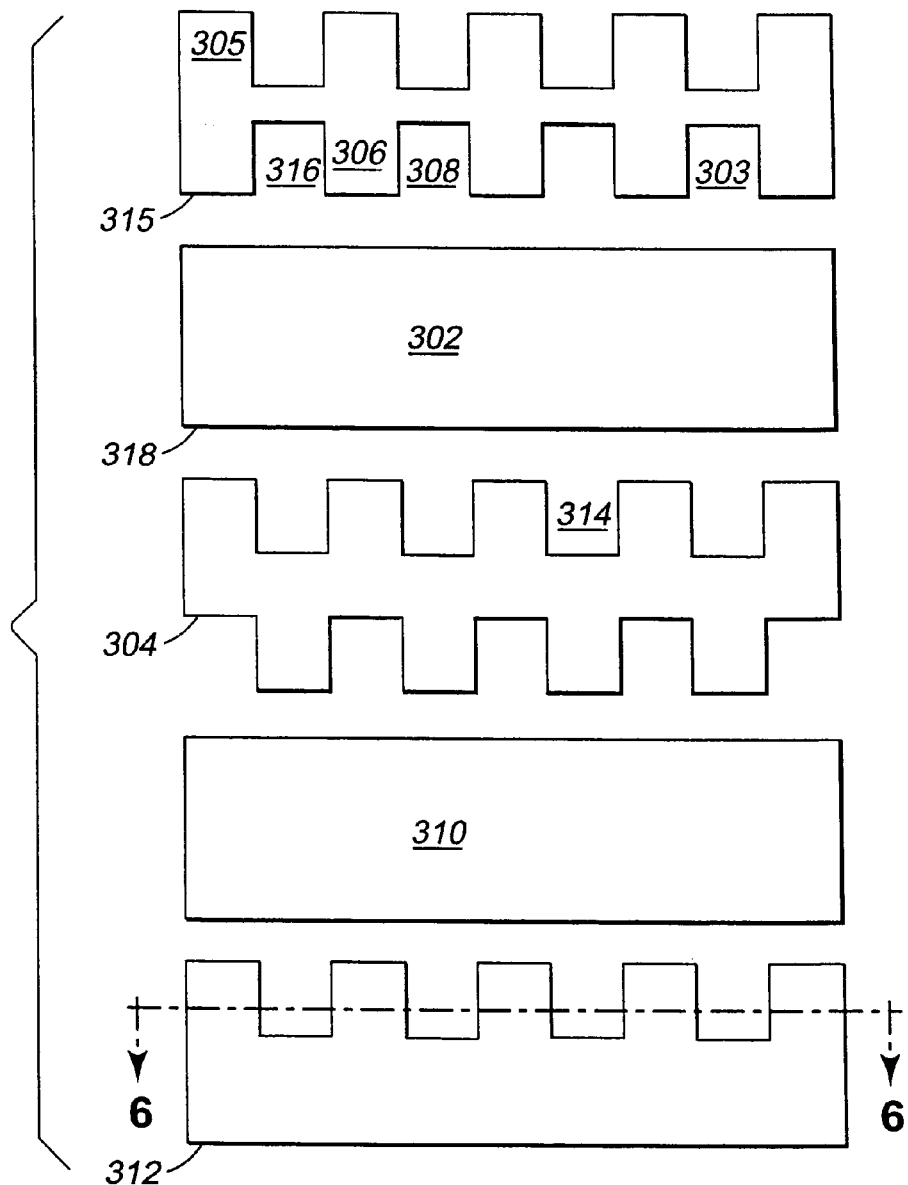
FIG. 5 shows a basic flow field apparatus according to the first embodiment of the present invention.

A fuel cell works properly only if fuel has been properly delivered to the membrane to be reacted an/or catalyzed. The membrane electrode assembly of the present invention uses a flow field assembly as shown in FIG. 5. Each membrane electrode assembly ("MEA") 302 is sandwiched between a pair of flow-modifying plates 305 and 312 which include biplates 304, 305 and end plates 312. A flow of fuel is established in each space 303 between each biplate/endplate and MEA. The collection of biplates/endplates and MEA forms a "stack". The biplate includes provisions for fluid flow at both of its oppositely-facing surfaces. The end flowplate of the stack is an end plate 312 instead of a biplate. The endplate has chambers on one side only. The biplate 305 includes a plurality of separators 306 and a plurality of chamber forming areas 308. The separators 306 have the function of pressing against the membrane electrode assembly 302. The end surface of separators 306 are substantially flat surfaces 315 that contact the surface of the MEA 302.

The biplates are formed of an electrically conductive material in order to couple all the membrane electrode assemblies 302, 310 in series with one another.

Membrane electrode assemblies 302, as described above include an anode, a membrane, and a cathode. The anode side 318 of each membrane electrode assembly is in contact with an aqueous methanol source in space 314. The cathode side of each membrane electrode assembly is in contact with an oxidant air source which provides the gaseous material in space 316 for the reactions discussed above. The air can be plain air or can be oxygen.

Flows of these raw materials are necessary to maintain proper supply of fuel to the electrode. It is also desirable to maintain the evenness of the flow.

Figure 6:
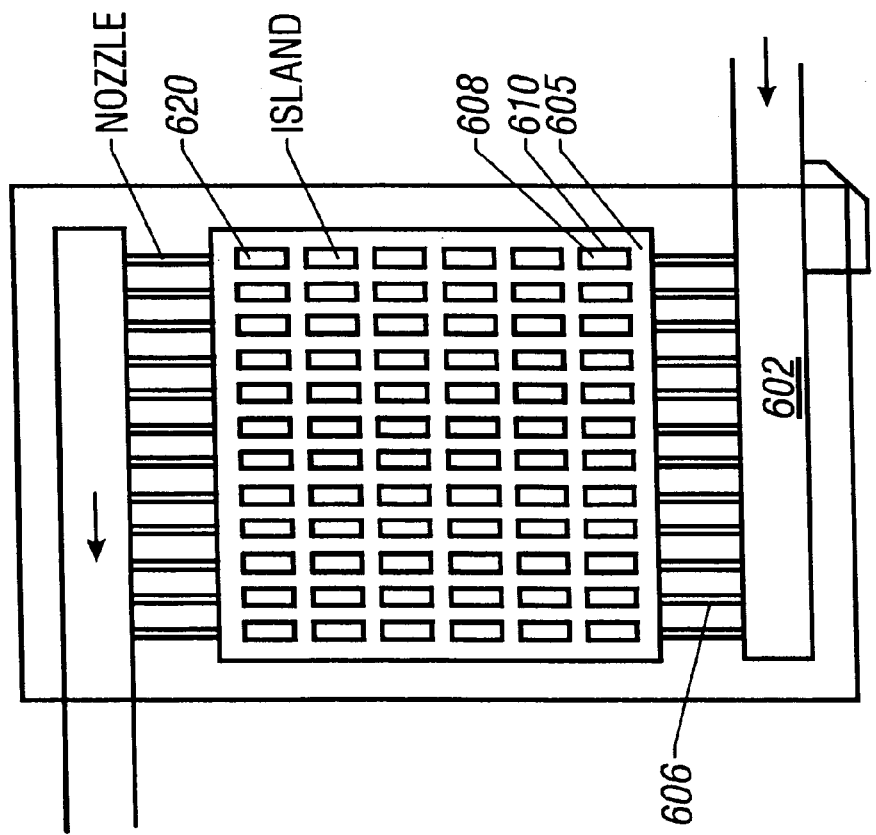
FIG. 6 shows a cross-sectional view of the preferred flow field along the line 66 in FIG. 5.

One stack design of the present invention uses the system shown in FIG. 6. The fuel is supplied from fuel supply chamber 602, which is typically a high volume element which includes fuel under pressure. Narrow nozzle-like elements 606 cause a large pressure drop therealong. The pressure drop in the thin line is much greater than any pressure drop along the supply. This evens the flow within the cells and among the cells.

A careful trade-off must be balanced between the amount of surface acting as a pressing element and the amount of surface that acts as a holding element.

It is desirable to apply even pressure against the membrane electrode assembly 202 from both sides for many reasons. However, in places where the pressing surface 306 presses against the membrane, the membrane electrode assembly 302 cannot be directly in contact with the methanol. Instead it is pressed by the surface 315. Therefore, that part of the surface of MEA 302 does not react. The different designs according to the present invention carry out various functions to improve the flow or improve some characteristic of its reliability.

Each of the nozzles 606 has a narrow width. The outlet 605 of each nozzle 606 faces one island pressing area 608 which corresponds to a pressing surface 306. The supply of fuel from nozzle 606 is supplied directly against the interface surface 610 of island 608. The islands 608 in FIG. 6 are rectangular in shape. Interface surface 610 is a narrow side of the rectangular island 608. The wider side of the island is parallel to the flow. All input flows face directly against one of the surfaces of an island 608.

The inventor found that this preferred narrow layout creates turbulence in the area of the islands 608. The turbulence stirs the fuel in the chamber and forms a more even flow through the system. This turbulence also facilitates flow between each of the islands 608. The output flow is eventually received by output nozzles 612 and routed into output conduit 614. The output nozzles are analogously placed adjacent surfaces 620 of the islands 608, thus causing further turbulence.

The islands according to this embodiment are 50 mil on the interface side 610, and 150 mil on the wider side. The pressure drop across the stack is approximately 0.06 psi for the stack.

Other biplate configurations can also be used.

It is important that the biplates themselves be lightweight and thin, to allow increase of the stacking pitch as much as possible.

Graphite is difficult to machine, and is relatively thick. Graphite's advantages include its imperviousness to liquid and gas.

A number of alternative solutions are used according to the present invention. A first modification of the present invention uses the system shown in FIG. 7.

Interface layer 702 forms a dense, conductive liquid gas impervious layer. This reduces the amount of fuel, gas or liquid which can cross the biplate assembly over the materials. However, a dense porous material is used as the crossing areas 700. The porosity allows a certain amount of the material to seep into the MEA through this interface layer.

The dense porous material can be conductive carbon, for example, which is much easier to machine than graphite. The seepage is stopped by interface material, which prevents the liquid and gas from crossing across the whole biplate.

The porosity of the pressing parts allows the liquid and gas to reach some of the parts of the membrane electrode assembly which are being pressed by the pressing element. The methanol hence may penetrate to these areas which would otherwise be less efficiently convecting.

The central binding layer 704 is low-density ("LD") carbon. LD carbon is relatively easy to work with and inexpensive. Since the LD carbon is covered at all locations by graphite, however, its undesirable characteristics are mostly masked.

A second embodiment used to form a biplate is shown in FIG. 8. This second biplate embodiment uses a layered titanium-carbon ultrathin biplate. Any biplate should be thin; because we want the stack to be as thin as possible for any given voltage. Each membrane electrode assembly and biplate will produce a voltage when energized, we call that the inherent voltage. The inherent voltage, and the thickness of the device, sets the maximum possible volts-per-inch of thickness of the device of the present invention. One important component of the volts-per-thickness is the thickness of the biplate.

FIG. 8 shows the second biplate embodiment of the present invention. This material uses a layered concept to form a biplate combining the best characteristics of the materials. A titanium carbide interface layer 800 is bonded to titanium bonding layer 802. The titanium bonding layer 802 is preferably 3 mils thick. These two layers together prevent migration of any protons across the biplates and also ensure adequate electrical bonding characteristics. The titanium materials are covered with separating materials 804 which include surfaces to hold the biplates in place. A certain measure of porosity is hence enabled as in the FIG. 7 embodiment.

Of course, the titanium could be replaced by any metal with similar conducting and chemically stable characteristics.

The inventors of the present invention recognize that the graphite material usually used must represent a trade-off between the competing necessities.

Efficiency of operation requires that fuel from one side of one biplate, e.g. the anode side, not seep across to to the other side of the same biplate, which interfaces to a cathode. If the biplate were porous, the fuel materials could seep across. However, since no fluids can pass through the biplates, this has meant that no fluids can reach the portions of the electron membrane assembly being pressed by the pressing surfaces biplates, e.g. 306. Therefore these portions of the membrane electrode assembly which are being pressed by those pressing surface are not efficiently producing electrical activity. This lowers the overall efficiency of the cell.

These embodiment of the present invention provide a new kind of trade-off. The membrane electrode assembly is pressed by a porous portion of the biplate. This porous portion allows at least some of the fuel to reach that portion of the electrode. This can improve the electrical operation of the MEA. This feature of the present invention also provides other bonded pieces which prevent the fluid from passing over into the other portions of the electrode membrane assembly.

System.

Figure 9:
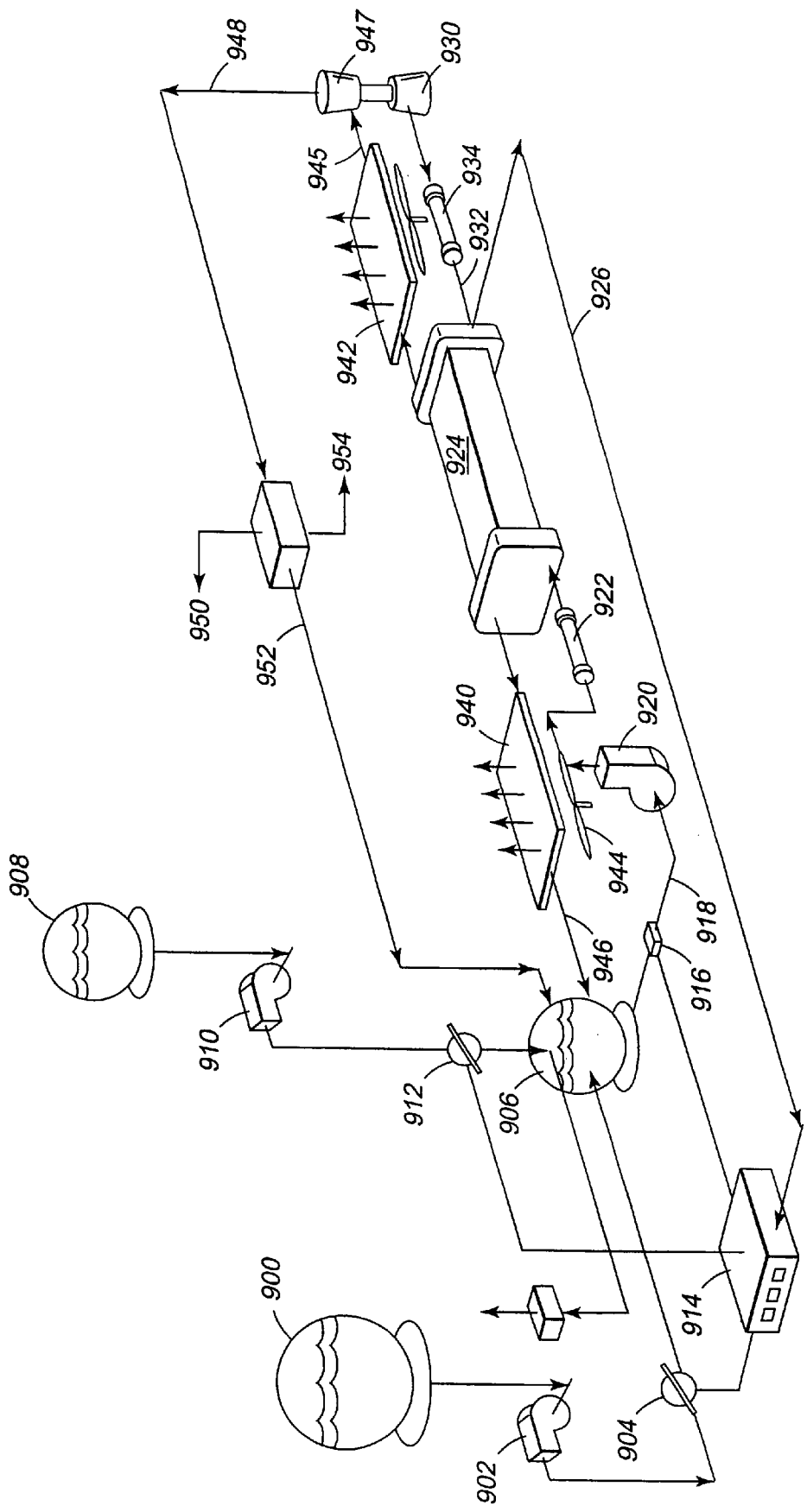
FIG. 9 shows a system operation of the direct methanol field fuel cell.

The basic system of the present invention is shown in FIG. 9. The system is based on the inventor's recognition of ways of recycling the output of the fuel cell. The fuel cell consumes methanol or methanol derivatives, water and produces output products including methanol or derivatives, water, and gases. Methanol represents the fuel that is to be consumed. Any fuel cell system would need to carry quantities of methanol fuel to be consumed. However, this reaction would also require equal amounts of water. The inventors recognized that the water used in the reaction can be recycled from the cathode.

The amount of power that a vehicle can produce is limited by its payload—i.e. the weight of the vehicle and its occupants. All vehicles are limited in power by the amount of weight that they must carry. More weight limits a vehicle's power and hence makes the vehicle less efficient. For example, a passenger car usually does not hold more than 20–30 gallons of gasoline. This has been determined by many to represent an optimum trade-off between the distance that the vehicle can run before re-filling the tank, and the excess weight that would result from a larger fuel tank.

Vehicle engineers decide how much payload weight they are willing to allow. The inventors describe techniques which ensure that this weight is taken up by fuel, not water.

One of the features of the system of the present invention is to maintain the water balance so that most of the water is recycled and no substantial source of water needs to be carried.

The overall system is shown in FIG. 9. Methanol tank 900 stores pure methanol (or other methanol-type derivative fuel). A first liquid pump 902 pumps the methanol through a valve 904 to a circulation tank 906. Water tank 908 provides a supply of water where necessary. The water is pumped by pump 910 through valve 912 to recirculation tank 906. A central controller 914 controls the overall operation of the entire system. Controller 914 controls the relative positions of the valves 904 and 912.

Methanol concentration sensor 916 is preferably located either in the methanol or very close to it. Methanol sensor 916 detects the concentration of methanol in the circulation tank, and controller 914 uses this information to control further operation of the system.

The aqueous methanol in the circulation tank is maintained by this control system at 1–2 M. Therefore, the methanol in line 918 should also be of the proper concentration. Pump 920 pumps the methanol through a fuel filter 922 to the membrane electrode stack 924. The stack used herein can be a similar stack to those described previously. The electrical output 926 of the stack 924 is sent to the motor to drive the payload and also drives controller 914 and other electrical systems such as the compressor 930.

The stack is also driven with inlet air 932 through the compressor 930. Air filter 934 cleans the air prior to its introduction into the stack.

The fuel out of the stack includes two components: water and methanol. Both components are processed using respective condensers 940 and 942 to lower the water temperature sufficiently to allow both the methanol and the water to condense. Fans 944 may be used to facilitate this cooling. The recycled methanol and water are both resupplied to the circulation tank. The recycled methanol 946 from the output of the methanol stack, and the recycled air and water from the inlet air 952 recycle into circulation tank 906.

Fluid engineers have recognized that pumping gas is extremely expensive in terms of energy resources, while pumping liquid is extremely inexpensive. One aspect of the present invention may require pressurizing the air to the cathode. For example, the air may need to be pressurized to 20 psi. However, the output air on line 945 (after reacting with the cathode) will be almost as highly pressurized. This output air 945 will be pressurized to 19 psi. Accordingly, the output air 945 is coupled to a pressure-driven turbine 947. This expander is run by pressure, and used to drive the air compressor 930. Without this recycling of the pressurized power, the air compressor might use as much as 20–30% of the power produced by the cell.

Expander output 948 includes an air and water combination. This water and air is separated to vent the exhaust air at 950, and the recycled water being returned to the circulation tank 902. A vent for excess water 954 may also be necessary. This vent is controlled by controller 914, and necessary at some time if too much water is being recirculated.

As an alternative to the sensor and controller, the amount of fuel which is supplied can be metered. The fuel cell first starts its operation at room temperature. However, the current fuel cell is intended to operate at about 90° C. The electrochemical fuel cell reaction will eventually heat up the fuel cell to the proper temperature.

Figure 10:
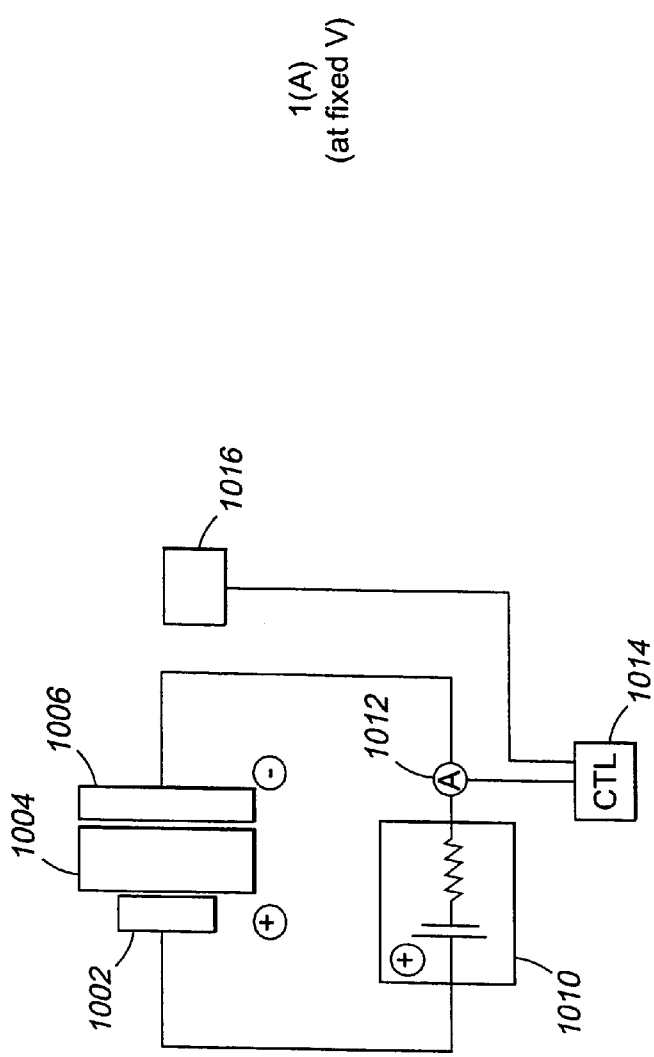
FIG. 10 shows how the fuel cell concepts described above would be modified for use in a methanol sensor.

The present invention operates using methanol sensors. A particularly preferred methanol sensor uses MEA technology described above. As described above, a fuel cell is formed of an anode and a cathode. The anode receives methanol. The cathode receives air or oxygen. This sensor uses the modified fuel cell shown in FIG. 10. A Pt-Ru anode 1002 is connected to a NAFION™ tetrafluoroethylene-perfluorovinyl ether sulfonic acid copolymer electrolyte 1004, which is connected to a Pt cathode. The cathode is preferably larger than the anode, e.g., the cathode is three times the area of the anode.

The cathode 1006 (and anode) are immersed in the methanol solution. Therefore, since the cathode 1006 is under fluid, it cannot react with air, and hence the $H_2$ cannot react to $H_2O$ as in the basic fuel cell reaction. Applying a voltage to the fuel cell changes, e.g. reverses, the reaction which occurs. Under current, the anode reacts directly with methanol to form CO2, and the cathode will change protons to hydrogen. A small cathode, and a large anode to reduce protons, further enhances the sensitivity of this methanol electrode.

The reactions, therefore, include:

(+) $H_2O+CH_3CO_2+6H^++6e^-$ (-) $2H^++2e^- \rightarrow H_2$

Figure 11:
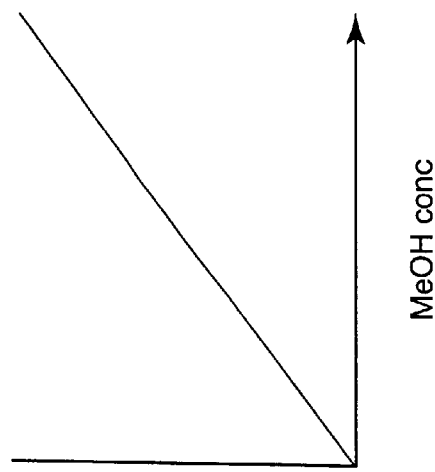
FIG. 11 shows the methanol concentration versus current relationship of the present invention.

A constant voltage is applied by constant voltage circuit 1010. Ammeter 1012 measures the current. FIG. 11 shows the relationship between the current and the methanol concentration in the solution. Controller 1014, which can be a process controller or microprocessor, looks up the closest methanol concentration corresponding to the measured current, using the plotted FIG. 11 relationship.

Since the FIG. 11 plot may be highly temperature dependent, thermocouple 1016 may provide correction information.

Figure 12:
FIG. 12 shows a graded molecular sieve fuel cell for methanol according to the present invention.

Another important feature of the present invention is related to practical use of this system in an automotive environment. Practical use would require delivery of methanol from the methanol equivalent of a gas pump. Methanol would have hydrocarbon impurities when taken from the gas pump. Such impurities would be very dangerous to the system described by the present invention which requires highly pure methanol. According to the present invention, a fuel filter is used. The fuel filter is shown in FIG. 12. A three stage filter including zeolite crystals therein of the synthetic 25 M (Mobil) types or the natural types. Typically a zeolite acts as a molecular sieve. The zeolite crystals are used to filter the methanol to remove any hydrocarbon impurities therefrom. These zeolites can include a set of layers of three or more with pore sizes varying from 3–10 Å gradually from layer 1–3.

Layer 1 is typically the large pore diameter zeolite, offerite, to remove large molecules. Mordenite, a natural zeolite, is used in layer 2 to exclude n-paraffins, n-butanes and n-alkanes. Zeolite 3A or 4A can be used to remove small molecules such as propane and ethane in layer 3. This preferably forms a graded molecular sieve. Mono-polar approaches.

Previous approaches to fuel cells used a number of fuel cells in series. The series connection of fuel cells adds the output voltages to form a higher overall allowed the output of the stack to be increased to a higher and more usable voltage. The inventor of the present invention realized, moreover, certain advantages which can be obtained from using a non stacked approach, which the present inventor has labelled mono-polar. This monopolar approach maintains each membrane electrode assembly completely separately from all the others. This completely different approach allows each element of the assembly to be made much larger, and with a better efficiency. However, we can only get a lower output voltage. Each mono-polar element can be assembled into a stack. The important thing according to this feature is that each membrane electrode assembly is separately connected, and the seperately connected elements are connected in series, rather than assembling them into a stack.

Figure 13:
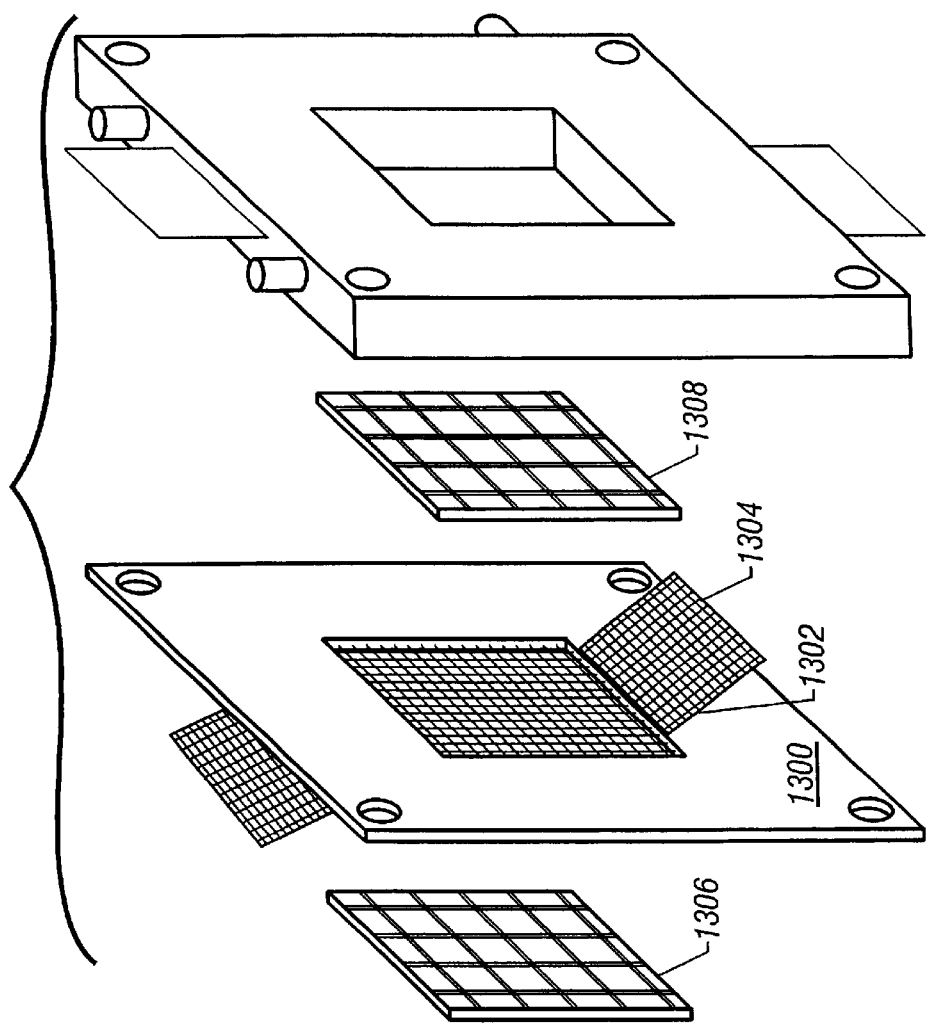
FIG. 13 shows a first, expanded, figure of a monopolar approach to a fuel cell of the present invention.

A first embodiment of the monopolar invention is shown in FIG. 13. This embodiment could be used to form a fuel cell that does not require contact forces in order to make electrical connections. Membrane 1300 is preferably a NAFION™ tetrafluoroethylene-perfluorovinyl ether sulfonic acid copolymer membrane. The NAFION™ tetrafluoroethylene-perfluorovinyl ether sulfonic acid copolymer membrane includes a central area with a termination of metal cloth strips 1302, eg a screen. The metal cloth or screen 1302 is covered with appropriate catalysts of the types described above. Current carrying tabs 1304 bring the voltage which is produced to the outside.

A plastic or metal flow field insert 1306 channels the appropriate fuel material to the respective side of the catalyst-covered cloth. Flow field element 1308 can be located on the other side.

The material with the catalyst thereon is therefore attached to the NAFION™ tetrafluoroethylene-perfluorovinyl ether sulfonic acid copolymer backing and pressed thereagainst to form a fuel cell in a similar electrical but different mechanical way.

Figure 14:
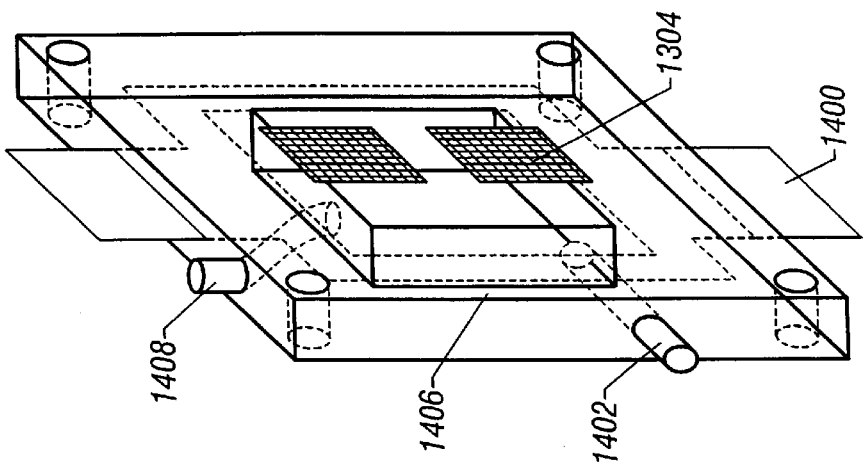
FIG. 14 shows the packaging of this monopolar approach.

FIG. 14 shows a cross-section of the device. The tabs 1304 conduct the electricity to an electrode area 1400. Methanol is brought into a methanol chamber 1402, into a sealed area on a first side of the membrane. The seal is maintained by a ring sealing area 1406. Air is conducted to a second side of the membrane through air chamber 1408, which is similarly sealed on the other side. Each of these elements operates as a stand-alone unit, independent of the other units. The current from these elements can be connected in series to provide a higher voltage.

A second alternative embodiment of the invention is shown in FIG. 15. This embodiment uses a membrane 1500, along with a titanium sheet 1502. Titanium cloth 1504 is spot-welded to the titanium sheet. The titanium cloth 1504 acts as the cathode and may be coated with platinum. Titanium cloth 1506 acts as the anode and may be coated with appropriate platinum ruthenium.

A gasket and bonding ring 1508 forms a chamber 1510 between the membrane and the anode. In a similar way, another gasket and bonding ring 1510 forms a chamber between the membrane and the cathode.

The titanium sheet has a bead seal 1512 thereon to maintain the chamber. Voltage produced by the titanium sheet is coupled to the current takeoff area 1514.

This embodiment also includes places for rivets or fasteners, since the bead sealing would allow metal fasteners to be used. This integrated system could be extremely thin, especially if titanium foil were used.

Figure 16:
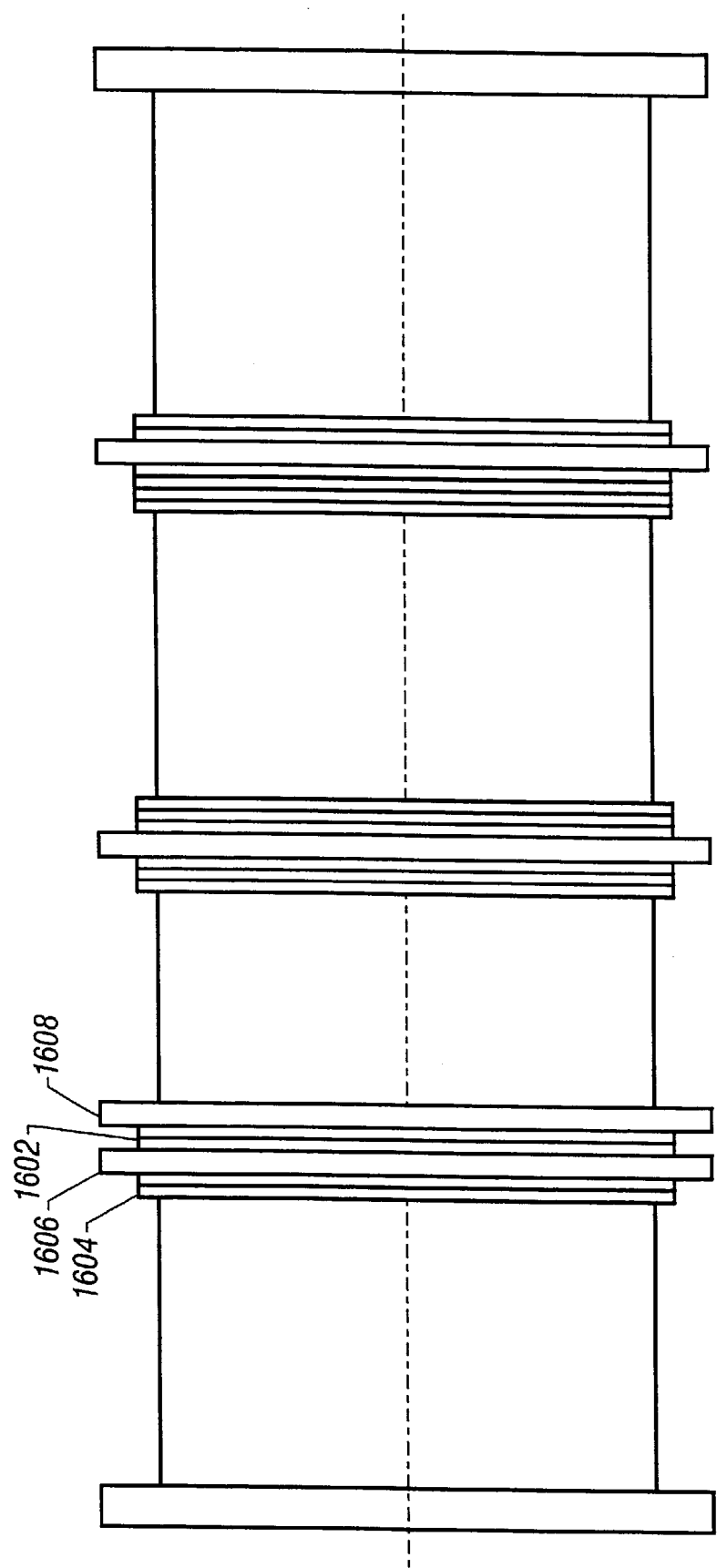
FIG. 16 shows how this monopolar approach would be assembled into an operating system.

The elements could be used in a device shown in FIG. 16. Each of these dual cell modules shown in FIGS. 13 or 15 includes a cathode and anode thereon. The elements shown in FIG. 16 are assembled to form two adjacent anodes up to cells 1602 and 1604 which face one another. A flow field 1606 is established between the anode 1602 and 1604. This flow field should include an air flow there between. In a similar way, two adjacent cathode face one another and a flow field 1608 is formed therebetween to include the appropriate airflow therebetween.

Figure 17:
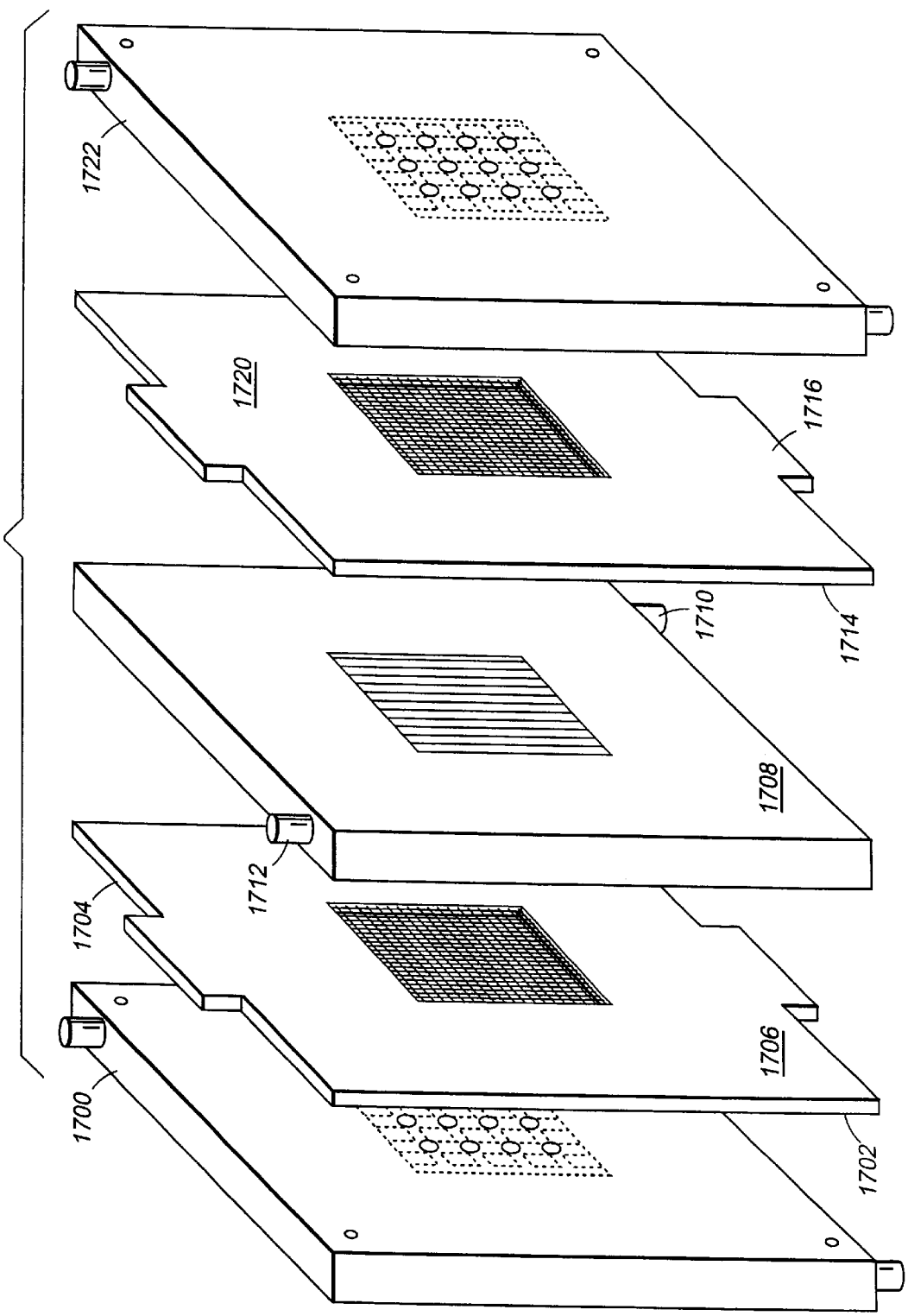
FIG. 17 shows the different expanded layouts of the monopolar approach assembly.

FIG. 17 shows an expanded view of how these cells would be used. Flow field 1700 is an airflow field which faces the cathode side 1702 of first cell 1704. The anode side 1706 faces a second, methanol flow field 1708. Methanol is input through methanol input port 1710 and out through output port 1712. The methanol flow field also faces the anode side 1714 of a second bipolar cell 1716. The cathode side 1720 of the second bipolar cell 1716 faces another flow field element 1722 for air.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of delivering methanol fuel to a methanol fuel cell, comprising
   (a) contacting methanol fuel with a fuel filter comprising an input orifice for receiving methanol fuel, molecular sieves for removing impurities from the methanol fuel, and an output orifice for outputting purified methanol, and
   (b) delivering the purified methanol fuel to a methanol fuel cell.

2. A method as in claim 1 wherein said molecular sieves comprise a zeolite.

3. A method as in claim 2 wherein said fuel filter includes a plurality of stages, each stage comprising a different zeolite.

4. A method as in claim 3 wherein each said stage includes a zeolite having a different pore size from the zeolite in each of the other stages.

5. A method as in claim 4 wherein said pore sizes vary from 3 angstroms to 10 angstroms.

6. An apparatus comprising:
   (a) a methanol fuel cell, and
   (b) a fuel filter upstream of said methanol fuel cell, said fuel filter comprising an input orifice for receiving methanol fuel, molecular sieves for removing impurities from the methanol fuel, and an output orifice for outputting purified methanol fuel to said methanol fuel cell.

7. An apparatus as in claim 6 wherein said fuel filter comprises a plurality of stages that include molecular sieves, each of said stages comprising molecular sieves that are different from the molecular sieves in each of the other stages of said fuel filter.

8. An apparatus as in claim 6 wherein said molecular sieves comprise a zeolite.

9. An apparatus as in claim 7 wherein said fuel filter comprises at least three stages in which the first stage removes larger diameter material than the second stage.

10. An apparatus as in claim 9 wherein the first stage comprises a zeolite having a first pore diameter, the second stage comprises a zeolite having a second pore diameter that is smaller than said first pore diameter, and the third stage comprises a zeolite having a third pore diameter that is smaller than said second pore diameter.

11. An apparatus as in claim 10 wherein said first stage comprises offerite, said second stage comprises mordenite, and said third stage comprises zeolite 3*a* or 4*a*.

12. An apparatus as in claim 10 wherein said second stage comprises a zeolite capable of removing n-butane.

13. An apparatus as in claim 10 wherein said third stage comprises a zeolite capable of removing propane and ethane.

14. An apparatus as in claim 6 wherein said fuel filter comprises a graded molecular sieve.

* * * * *

UNITED STATES PATENT AND TRADEMARK OFFICE
CERTIFICATE OF CORRECTION

PATENT NO. : 6,265,093 B1 Page 1 of 1
DATED : July 24, 2001
INVENTOR(S) : Sekharipuram R. Narayanan, Barbara Jeffries-Nakamura, Subbarao Surampudi, Gerald Halpert, Harvey A. Frank, Andrew Kindler and William Chun It is certified that error appears in the above-identified patent and that said Letters Patent is hereby corrected as shown below:

<u>Column 1,</u>
Line 12, please insert the following:
-- <u>Statement Regarding Federally Sponsored Research or Development.</u>

The invention described herein was made in the performance of work under a NASA 7-1407 contract, and is subject to the provisions of Public Law 96-517 (U.S.C. 202) in which the contractor has elected to retain title. --

Signed and Sealed this

Fourth Day of June, 2002

*Attest:*

*Attesting Officer*

JAMES E. ROGAN
*Director of the United States Patent and Trademark Office*